(12) United States Patent
Chiu et al.

(10) Patent No.: US 12,504,580 B2
(45) Date of Patent: Dec. 23, 2025

(54) REDUCED BRIDGE STRUCTURE FOR A PHOTONIC INTEGRATED CIRCUIT

(71) Applicant: Intel Corporation, Santa Clara, CA (US)

(72) Inventors: Chia-Pin Chiu, Tempe, AZ (US); Kaveh Hosseini, Livermore, CA (US); Omkar G. Karhade, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 17/740,068

(22) Filed: May 9, 2022

(65) Prior Publication Data

US 2023/0358952 A1 Nov. 9, 2023

(51) Int. Cl.
*G02B 6/12* (2006.01)
*G02B 6/293* (2006.01)

(52) U.S. Cl.
CPC ............ *G02B 6/12007* (2013.01); *G02B 2006/12061* (2013.01); *G02B 6/29338* (2013.01)

(58) Field of Classification Search
None
See application file for complete search history.

(56) References Cited

U.S. PATENT DOCUMENTS

| | | | | |
|---|---|---|---|---|
| 6,751,377 B2 * | 6/2004 | Baumann | ........... | G02B 6/12007 385/32 |
| 10,132,957 B2 * | 11/2018 | Hentz | ................ | G02B 6/29335 |
| 2004/0179573 A1 * | 9/2004 | Armani | ................ | H01S 3/0627 385/146 |
| 2005/0163185 A1 * | 7/2005 | Vahala | ............... | G02B 6/29341 372/67 |
| 2007/0269901 A1 * | 11/2007 | Armani | ................... | H01S 3/083 436/164 |
| 2011/0255822 A1 * | 10/2011 | Zheng | .................. | G02B 6/3508 385/16 |
| 2018/0180580 A1 * | 6/2018 | Tadigadapa | .......... | B01D 53/025 |
| 2020/0174186 A1 * | 6/2020 | Westerveld | ........ | G02B 6/12002 |
| 2024/0353617 A1 * | 10/2024 | Lo | ............................ | G02B 6/13 |

OTHER PUBLICATIONS

Dong, Po, et al., "Thermally tunable silicon racetrack resonators with ultralow tuning power," Optics Express; vol. 18, No. 19; Sep. 13, 2010; pp. 20298-20304; 7 pages.
Pan, Ying, et al., "Thermally tunable silicon microring resonators with ultralow tuning power," SPIE vol. 11048; 2019; Zhuhai, China; pp. 1104839-1-110483-4; downloaded from https://www.spiedigitallibrary.org/conference-proceedings-of-spie on Dec. 23, 2021; 5 pages.

* cited by examiner

*Primary Examiner* — Jerry Rahll
(74) *Attorney, Agent, or Firm* — Alliance IP, LLC

(57) ABSTRACT

A reduced bridge structure for a photonic integrated circuit (PIC) or any integrated circuit comprising a ring resonator structure. The reduced bridge structure is an architecture including an optical and electrical routing arrangement to reduce the number of bridges around the micro-ring structure of the ring resonator structure. Embodiments reserve one bridge portion for use as a signal trace, not routing the signal trace over a silicon waveguide. By not routing the signal trace over a silicon waveguide, the structure avoids possible interference between the radio frequency (RF) signal on the signal trace and optical communication (a light wave) propagating in the silicon waveguide.

25 Claims, 11 Drawing Sheets

FIG. 1A TOP VIEW
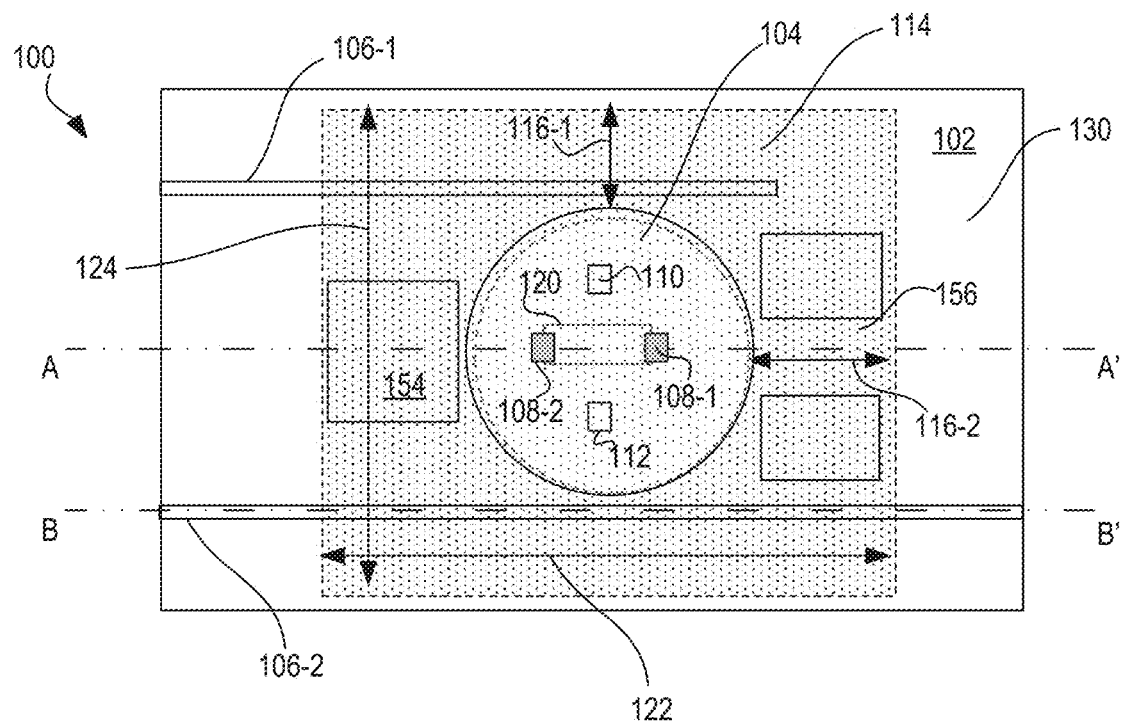
FIG. 1B A-A' CROSS-SECTIONAL VIEW
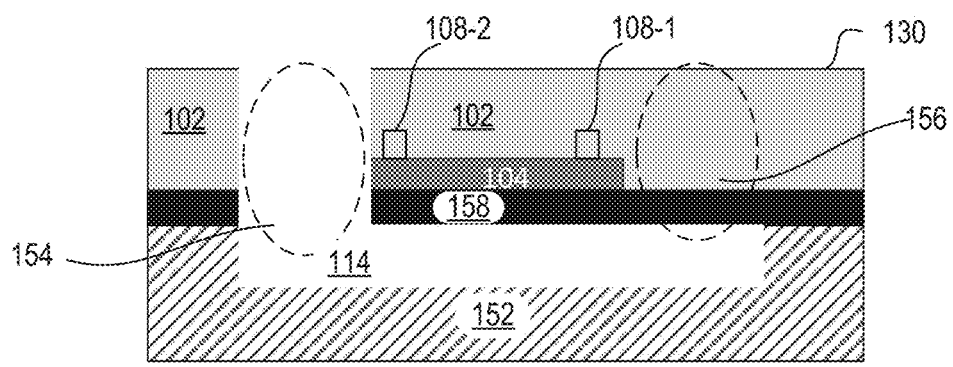
FIG. 1C B-B' CROSS-SECTIONAL VIEW
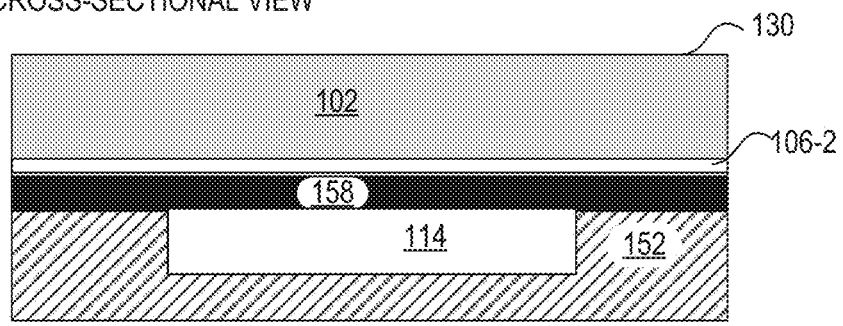

FIG. 2A TOP VIEW
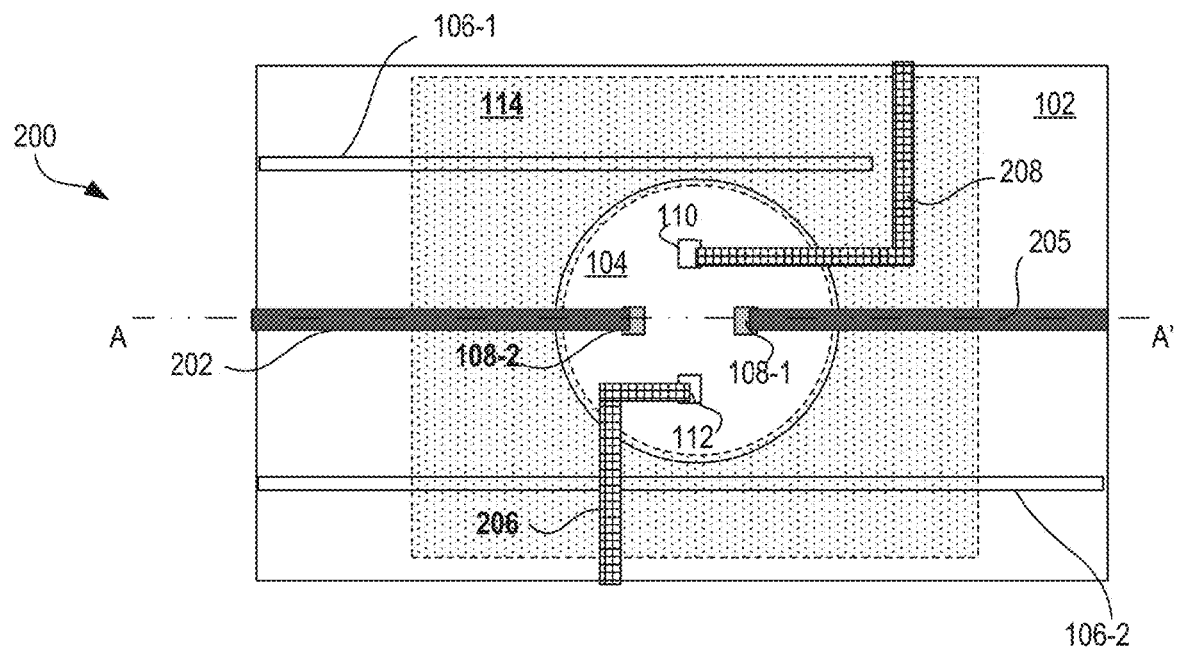
FIG. 2B TOP VIEW
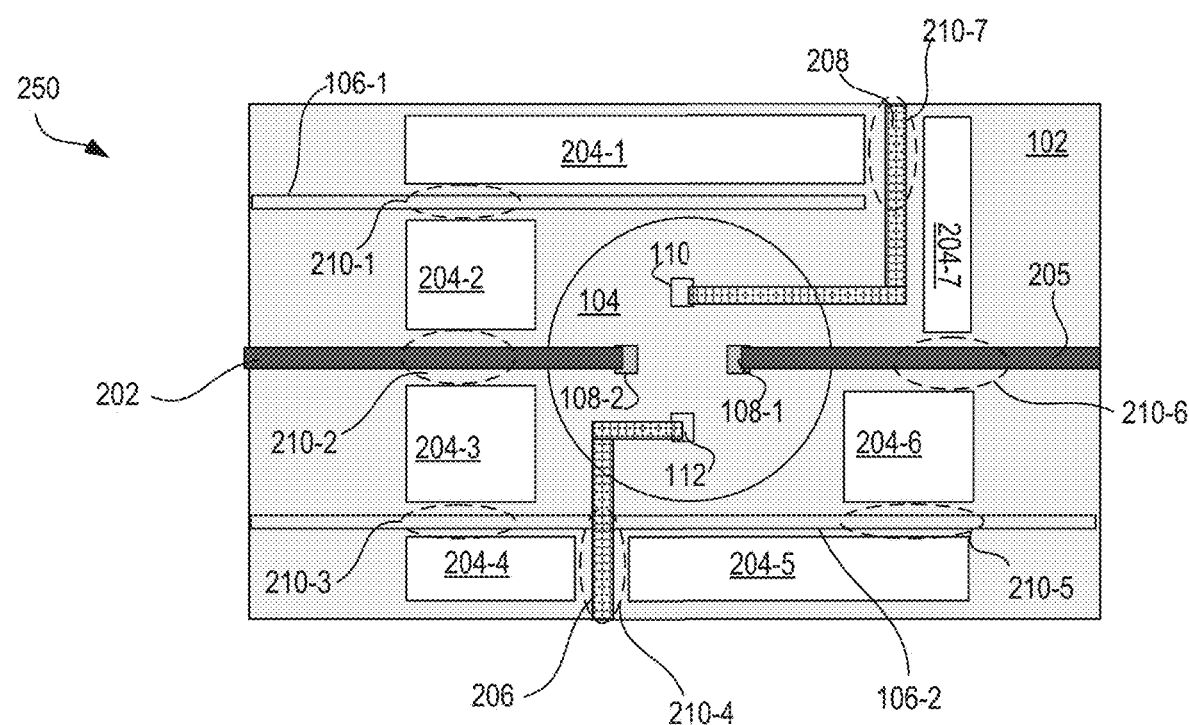

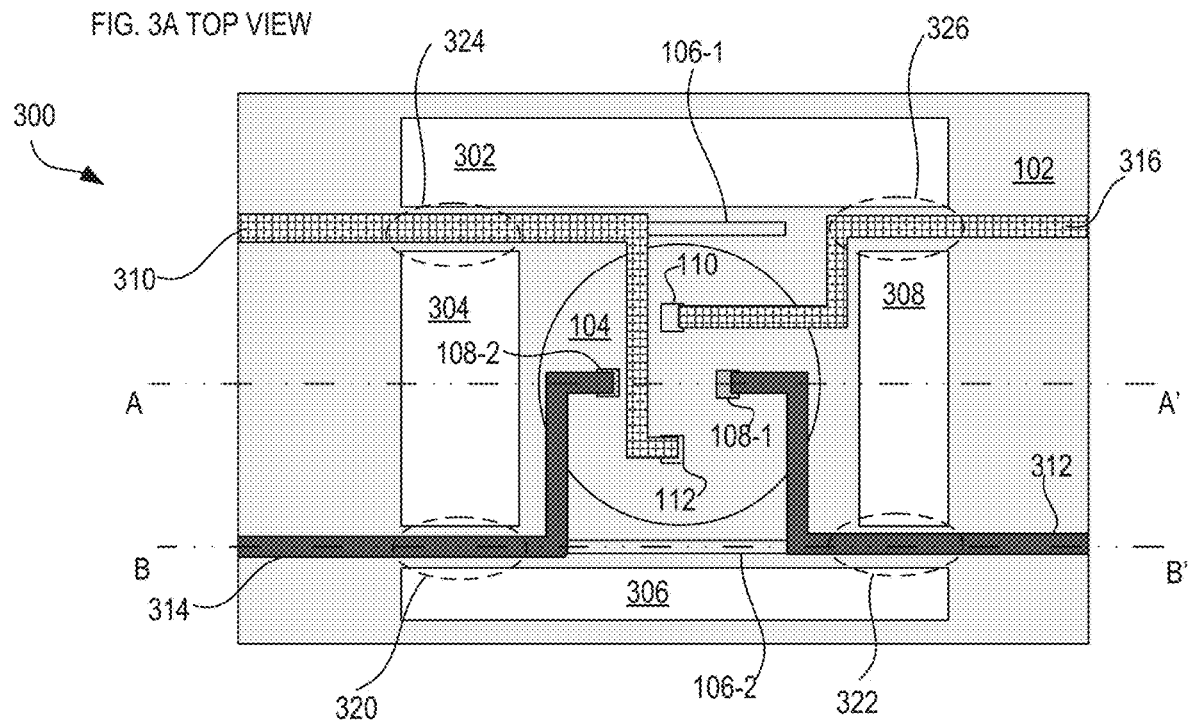
FIG. 3A TOP VIEW
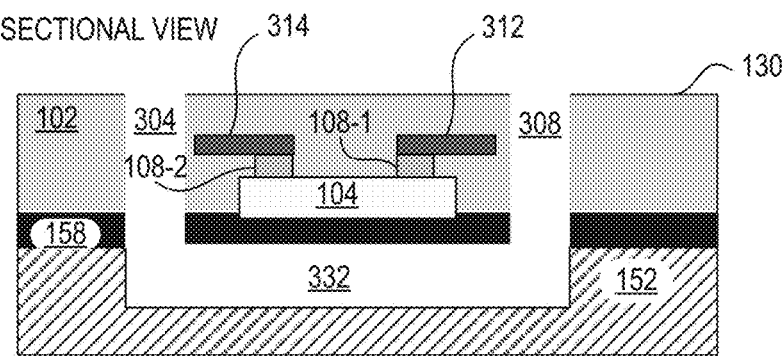
FIG. 3B A-A' CROSS-SECTIONAL VIEW
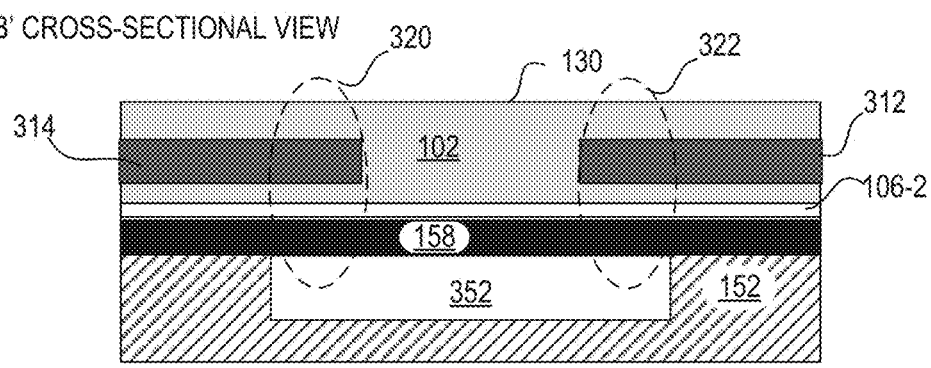
FIG. 3C B-B' CROSS-SECTIONAL VIEW

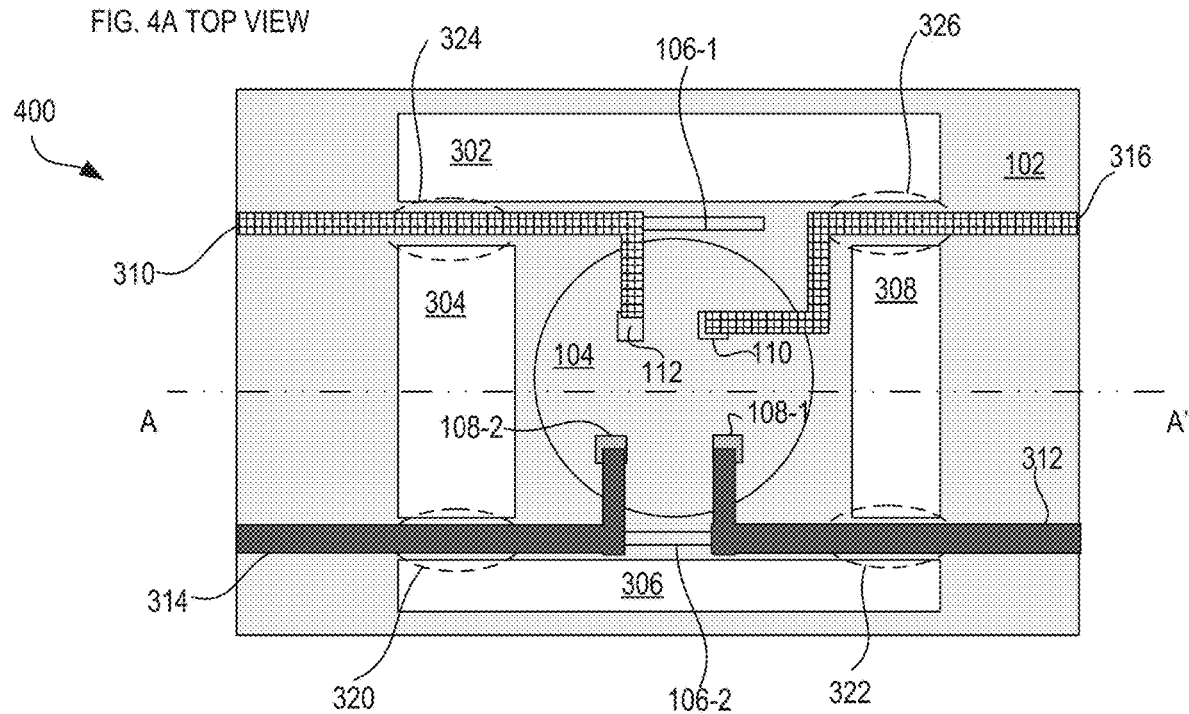
FIG. 4A TOP VIEW
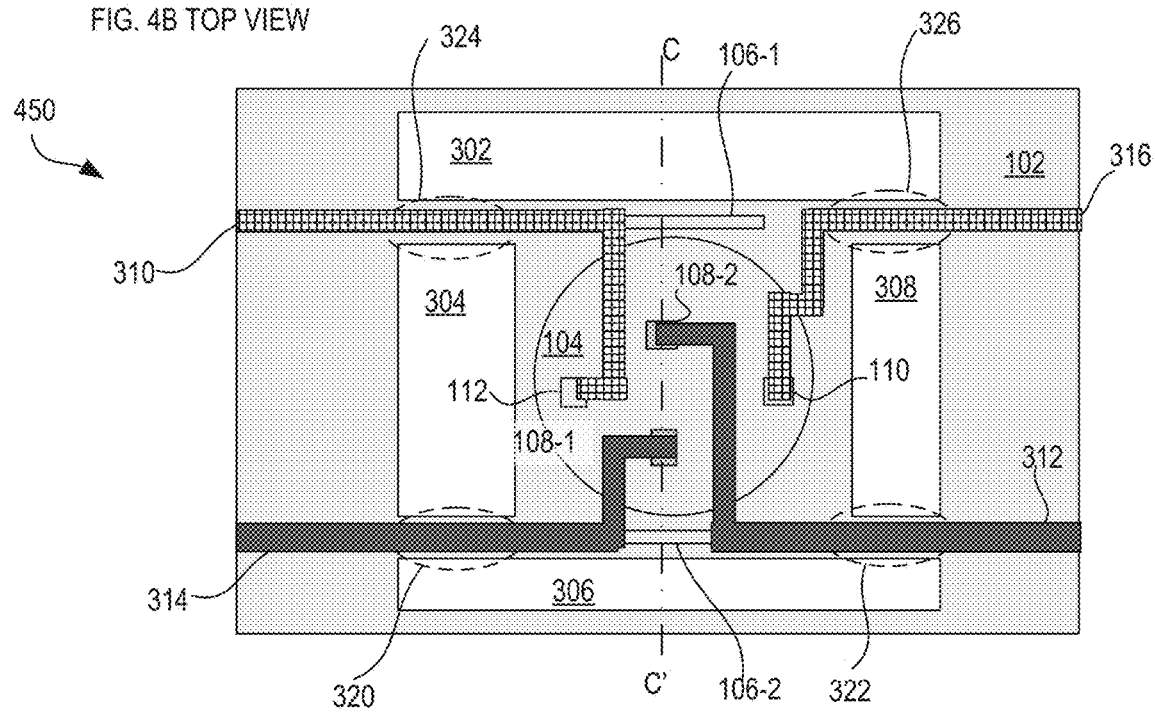
FIG. 4B TOP VIEW

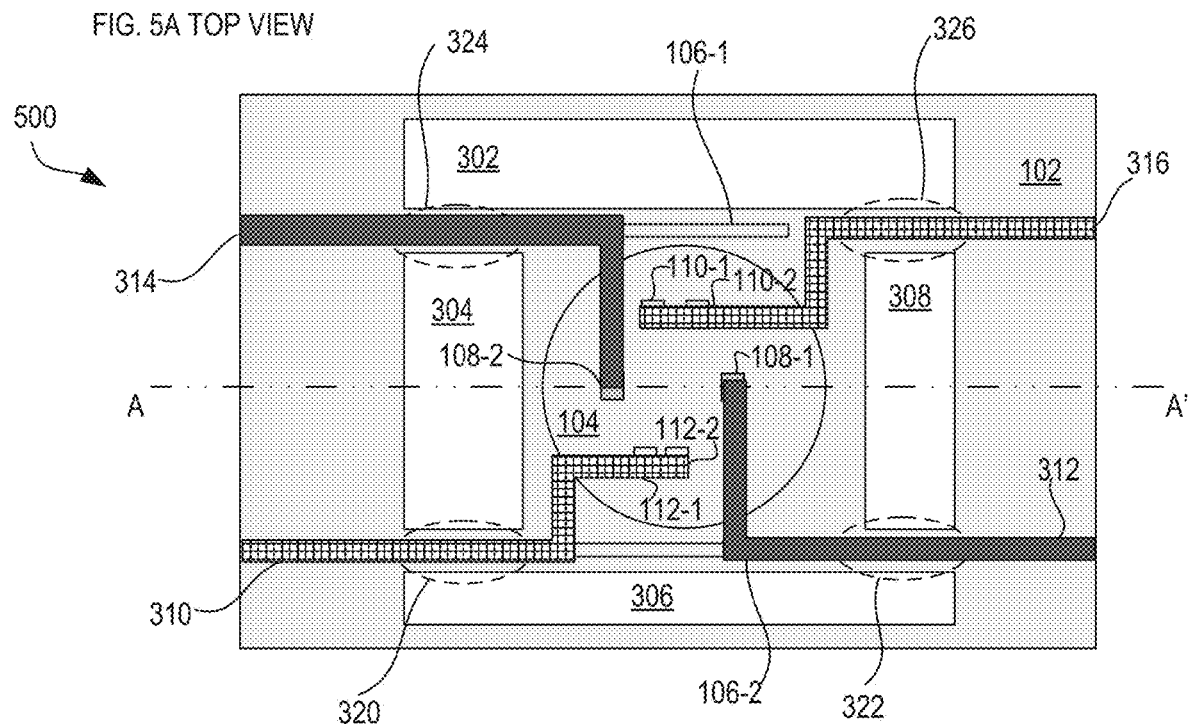
FIG. 5A TOP VIEW
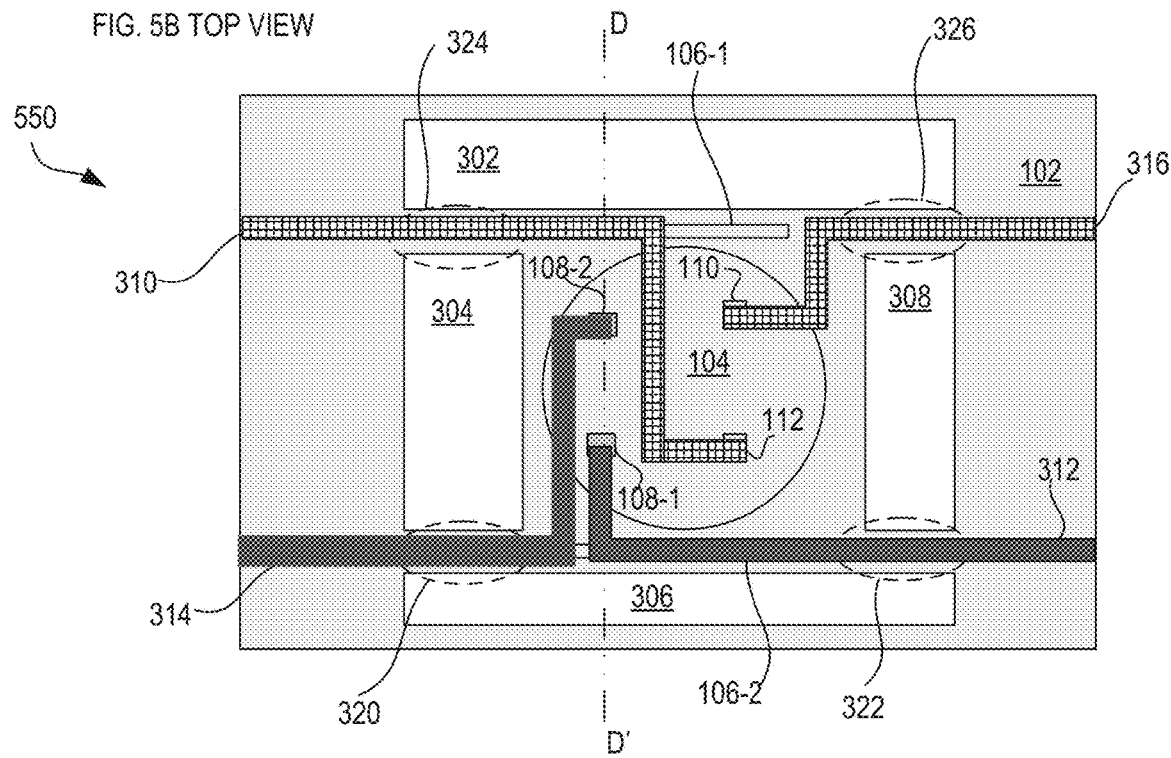
FIG. 5B TOP VIEW

FIG. 6A TOP VIEW
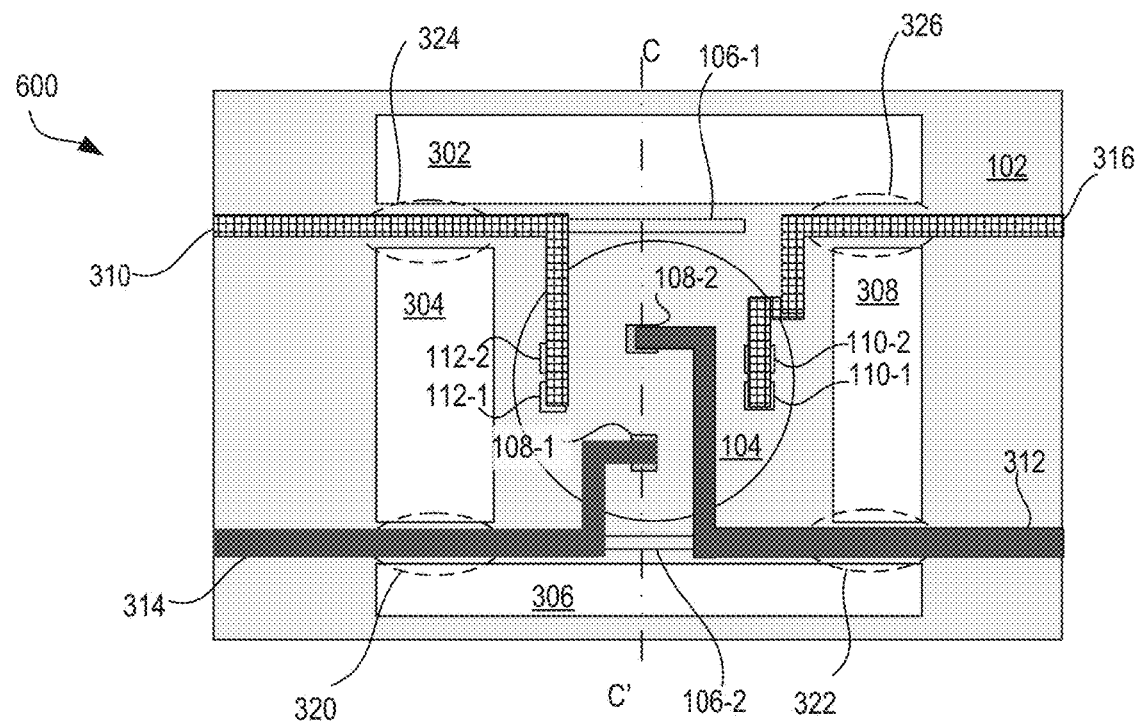
FIG. 6B TOP VIEW
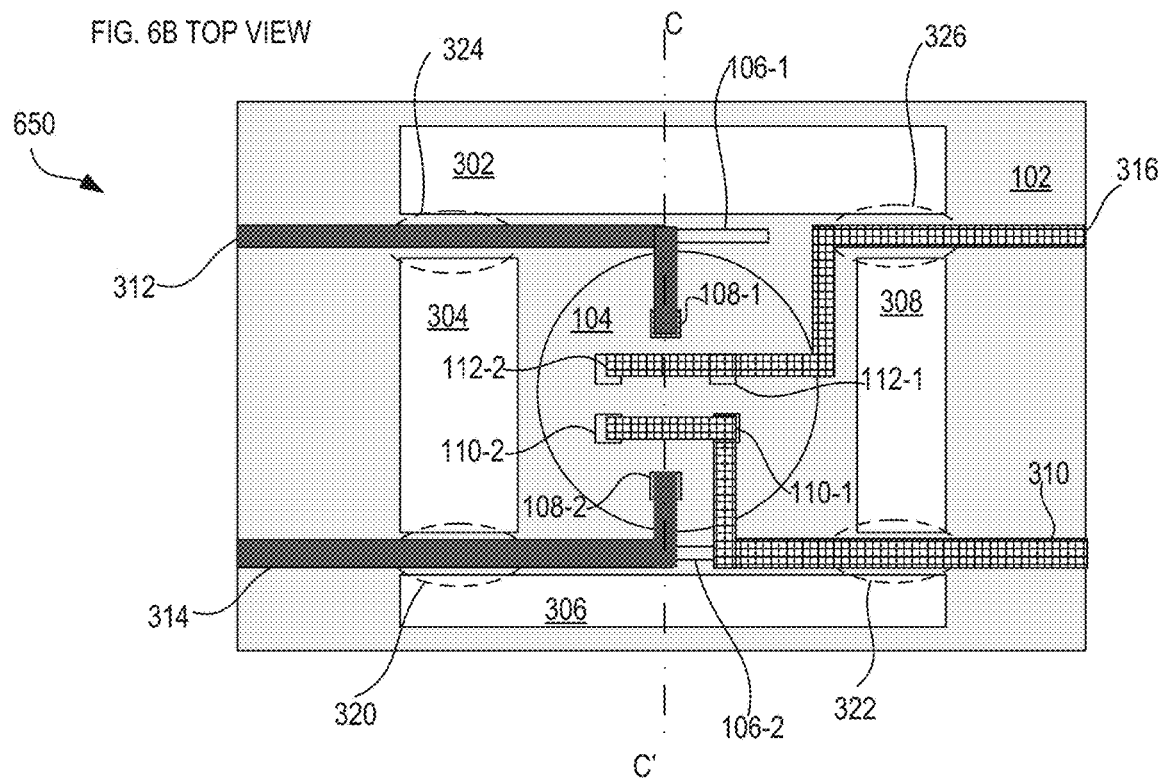

REDUCED BRIDGE STRUCTURE FOR A PHOTONIC INTEGRATED CIRCUIT

STATEMENT OF GOVERNMENT INTEREST

This invention was made with Government support under Agreement No. HR00111830002 awarded by the United States Department of Defense. The Government has certain rights in the invention.

BACKGROUND

Silicon photonics combines integrated circuits and semiconductor lasers and has enabled the combination of previously disparate optical components into silicon photonic integrated circuits (PIC) with fewer silicon photonics components that are more compact and lower power. One such silicon photonics component is a ring resonator structure, which can generate undesirable heat from an integrated heater used for thermal tuning. Thermally insulating air trenches and air cavities can be etched around the ring resonator structure to mitigate the heat generated. However, in available solutions, routing requirements limit the size and location of the air trenches and the air cavities. This routing requirement limitation is due to optical communication by silicon waveguides (e.g., input, through, and drop) and electrical communication by metal traces (e.g. signal trace, ground trace and heater traces) being routed over the air cavities, on bridges.

BRIEF DESCRIPTION OF THE DRAWINGS

FIGS. 1A-1C are illustrations providing different views of a structure including a ring resonator structure and an associated air cavity, in accordance with various embodiments.

FIGS. 2A-2B are illustrations depicting an initial communication trace routing scenario for the ring resonator structure of FIG. 1A.

FIGS. 3A-3C are illustrations depicting an improved communication trace routing for the ring resonator structure of FIG. 1A, in accordance with various embodiments.

FIGS. 4A-4B, 5A-5B, and 6A-6B are illustrations depicting alternative communication trace routing options, as a function of a location of heater contacts and metal contacts of the ring resonator structure, in accordance with various embodiments.

DETAILED DESCRIPTION

Figure 7:
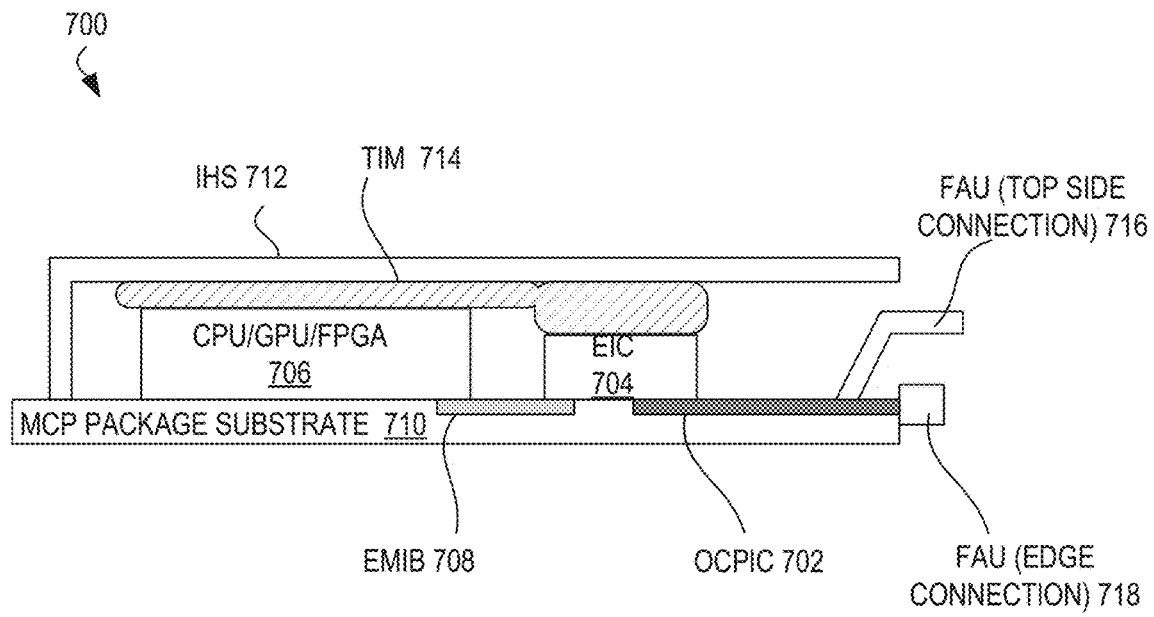
FIG. 7 is a simplified cross-sectional side view of a multi-chip package that includes a photonic integrated circuit (PIC) with a ring resonator structure, in accordance with various embodiments.

The following detailed description is merely exemplary in nature and is not intended to limit the application and uses. It may be evident that the novel embodiments can be practiced without every detail described herein. For the sake of brevity, well known structures and devices may be shown in block diagram form in order to facilitate a description thereof.

Silicon photonics is a technology that has enabled the combination of previously disparate optical components into silicon photonic integrated circuits (PICs) having fewer components that are more compact and lower power than other technologies. A non-limiting example is a component called a silicon micro-ring resonator (MRR), and generally referred to herein as a ring resonator structure. The ring resonator structure is a passive structure generally including (i) a circular micro-ring structure comprising an optical silicon waveguide that is looped back on itself to resonate at one or more frequencies referred to as a spectral response, or free spectral range (FSR), and (ii) a linear silicon waveguide located proximate to the micro-ring structure and communicating therewith. Silicon photonics has enabled the micro-ring structure to be very compact (i.e., have a small bend radius).

In various embodiments, the ring resonator structure employs an integrated heater for enhanced thermal tuning capability. The integrated heater can generate undesirable heat. An exemplary PIC can have thousands of ring resonator structures, and the heat generated can be especially technically challenging, because the PIC may be located next to an electronic integrated circuit (EIC), and the heat generated can adversely impact performance and power efficiency of the EIC, and/or a multi-chip package system that the PIC is utilized in. In some scenarios, such as wavelength division multiplexing (WDM) applications, the adverse effects of the heat from the MRR may be observed as an elevated energy-per-bit of a channel of a WDM system on a fiber array unit (FAU) connector on the MCP. Accordingly, dissipating the heat from the ring resonator structures in a PIC is a technical problem to solve.

Some solutions employ thermally insulating air trenches and air cavities, which can be etched in various layers and the substrate around the ring resonator structure, to mitigate the heat generated. However, the air cavity cannot interfere with communication traces to the ring resonator structure of the PIC. The communication traces comprise optical communication via silicon waveguides (e.g., as silicon waveguide signals referred to by those with skill in the art as input, through, and drop) and electrical communication via metal traces (e.g., signal trace, ground trace, and heater traces); these communication traces for the ring resonator structure are generally located on bridges formed in an oxide layer over the air cavity. A bridge formed over the air cavity undesirably increases heat lost from the ring resonator structure to the surrounding Si substrate. Accordingly, it is desirable to reduce the number of bridges utilized for communication traces to the ring resonator structure of the PIC.

The present disclosure provides a technical solution to the above-described problems related to bridges utilized for communication traces to the ring resonator structure of the PIC and provides an improvement over the limitations of available solutions, in the form of a reduced bridge structure for a photonic integrated circuit (PIC) or any integrated circuit comprising a ring resonator structure. The reduced bridge structure, shortened herein to "structure," is an architecture including an optical/electrical routing arrangement to reduce the number of bridges around the micro-ring structure of the ring resonator structure, and is described in more detail in connection with the figures below. As described in more detail below, the provided embodiments locate metal traces for the heater traces and a ground trace over/above a silicon waveguide.

Exemplary embodiments will hereinafter be described in conjunction with the following drawing figures, wherein like numerals denote like elements. Figures are not necessarily to scale but may be relied on for spatial orientation and relative positioning of features. As may be appreciated, certain terminology, such as "ceiling" and "floor", as well as "upper,", "uppermost", "lower," "above," "below," "bottom," and "top" refer to directions based on viewing the Figures to which reference is made. Further, terms such as "front," "back," "rear,", "side", "vertical", and "horizontal" may describe the orientation and/or location of portions of the component within a consistent but arbitrary frame of reference which is made clear by reference to the text and the associated Figures describing the component under discussion. Such terminology may include the words specifically mentioned above, derivatives thereof, and words of similar import.

As used herein, the term "adjacent" refers to layers or components that are in direct physical contact with each other, with no layers or components in between them. For example, a layer X that is adjacent to a layer Y refers to a layer that is in direct physical contact with layer Y. In contrast, as used herein, the phrase(s) "located on" (in the alternative, "located under," "located above/over," or "located next to," in the context of a first layer or component located on a second layer or component) includes (i) configurations in which the first layer or component is directly physically attached to the second layer (i.e., adjacent), and (ii) component and configurations in which the first layer or component is attached (e.g. coupled) to the second layer or component via one or more intervening layers or components.

The term "overlaid" (past participle of "overlay") may be used to refer to a layer to describe a location and orientation for the layer but does not imply a method for achieving the location and orientation. For example, a first layer overlaid on a second layer, or overlaid on a component means that the first layer is spread across or superimposed on the second layer or component. Accordingly, a layer that is overlaid on a second layer may be viewed in a cross-sectional view as adjacent to the second layer.

As used herein, the term "electronic component" can refer to an active electronic circuit (e.g., processing unit, memory, storage device, FET) or a passive electronic circuit (e.g., resistor, inductor, capacitor).

As used herein, the term "integrated circuit component" can refer to an electronic component configured on a semiconducting material to perform a function. An integrated circuit (IC) component can comprise one or more of any computing system components described or referenced herein or any other computing system component, such as a processor unit (e.g., system-on-a-chip (SoC), processor core, graphics processor unit (GPU), accelerator, chipset processor), I/O controller, memory, or network interface controller, and can comprise one or more additional active or passive devices such as capacitors, decoupling capacitors, resistors, inductors, fuses, diodes, transformers, sensors, electrostatic discharge (ESD) devices, and memory devices.

A non-limiting example of an unpackaged integrated circuit component includes a single monolithic integrated circuit die (shortened herein to "die"); the die may include solder bumps attached to contacts on the die. When present on the die, the solder bumps or other conductive contacts can enable the die to be directly attached to a printed circuit board (PCB).

A non-limiting example of a packaged integrated circuit component comprises one or more integrated circuit dies mounted on a package substrate with the integrated circuit dies and package substrate encapsulated in a casing material, such as a metal, plastic, glass, or ceramic. Often the casing includes an integrated heat spreader (IHS); the packaged integrated circuit component often has bumps or leads attached to the package substrate for attaching the packaged integrated circuit component to a printed circuit board or motherboard.

FIGS. 1A-1C are illustrations providing different views of a structure 100 including a ring resonator structure and an associated air cavity 114, in accordance with various embodiments. FIG. 1A is a top-down view; a cross-sectional view corresponding to a first cut A-A' medially through heater contacts 108-1 and 108-2 is depicted in FIG. 1B; and a cross-sectional view corresponding to a second cut B-B', laterally through a silicon waveguide 106-2 is depicted in FIG. 1C. Embodiments of the structure 100 are characterized by the geometries and spatial relationships described herein.

The structure 100 comprises an oxide 102 layer (also referred to herein as "oxide cladding") overlaid on a substrate 152 or wafer. The ring resonator structure is located in the structure 100, as shown. The ring resonator structure includes a micro-ring structure 104 and a silicon waveguide 106-2, as described above. In various embodiments, the micro-ring structure 104 is substantially circular and the silicon waveguide 106-2 is substantially linear (i.e., +/−10%) from a circle and +/−10% from linear. In some embodiments, the micro-ring structure 104 may have an oval shape or a shape of racing track. In some embodiments, the silicon waveguide 106-2 may include a curve in a region alongside the micro-ring structure 104, to enhance coupling effect between the silicon waveguide 106-2 and the micro-ring structure 104. In some embodiments of the ring resonator structure, the ring resonator structure further includes an optional second silicon waveguide 106-1 that is also linear. When silicon waveguide 106-1 is included in a ring resonator structure design, that silicon waveguide 106-1 is used as a "drop" and it is typically connected to a photo detector. The micro-ring structure 104, the silicon waveguide 106-1, and silicon waveguide 106-2 of the silicon waveguide structure are substantially planar (as used here, substantially means +/−5% from planar).

In the top view of FIG. 1A, the ring resonator structure is shown located in an inner region of the structure 100, the inner region being characterized in part by the air cavity 114. In various embodiments, the air cavity 114 may generally consume a length 122 and a width 124 around the micro-ring structure 104. In various embodiments, the air cavity 114 may extend under the ring resonator structure, however, in FIGS. 2A-6B, the stipple pattern is omitted in the area of the micro-ring structure 104 to make the object numbers easier to read. The area of the air cavity may be within a range of 2%-600% larger than a diameter of the micro-ring structure 104. Described differently, the air cavity 114 surrounds the micro-ring structure 104 and extends outward generally radially therefrom, as depicted with a radial indicator 116-1 and a radial indicator 116-2. The radial indicators 116-1 and 116-2 are substantially equal, +/−10%. The air cavity 114 may or may not be circular in the top view, in which case, the radial indicators 116-1 and 116-2 may instead be referred to as a width. In various embodiments, and portions of the inner region, the air cavity may extend under the micro-ring structure 104. The silicon waveguide 106-1 and silicon waveguide 106-2 are depicted as substantially parallel in FIG. 1A. The silicon waveguide 106-2 traverses the entire structure 100 from left (e.g., as "input") to right (e.g., as "through"), whereas the silicon waveguide 106-1 traverses from right to left in the structure 100 but does not extend across the entire structure 100 (e.g., as "drop"). The silicon waveguides are the aforementioned optical communication for the micro-ring structure and are a subset of communication traces described herein.

The cross-sectional views of FIGS. 1B and 1C introduce air trench, air cavity, and bridge concepts, generally, and the figures that follow address the concepts in more detail. In the cross-sectional views of FIGS. 1B and 1C, the ring resonator structure is shown located between the substrate 152 and the oxide layer 102. In some embodiments, as shown in the cross-sectional views, the ring resonator structure is fabricated on a silicon-on-insulator (SOI) wafer that has a buried oxide layer 158 ("BOX") overlaying the substrate 152, in these embodiments, in the inner region, the BOX 158 may be between the ring resonator structure and the substrate 152. A second region (an outer region) of structure 100 is substantially external to the air cavity 114.

The oxide 102 layer is a layer comprising oxygen, extends radially past the micro-ring structure 104, and may include silicon dioxide. The micro-ring structure 104 may comprise silicon. In some embodiments, the micro-ring structure 104 may comprise a lightly-doped P region, lightly-doped N region, highly-doped P+ region, highly-doped N+ region, intrinsic silicon and silicon dioxide (as a divider between different Si doping regimes when needed). The BOX 158 may comprise silicon dioxide. In various embodiments the BOX 114 layer is about 2-3 microns thick, and the substrate 152 may be about 50-250 microns thick (wherein "about" means plus or minus 10%).

In some embodiments, in particular, in areas not including the micro-ring structure 104, the oxide layer and the BOX 158 may be indistinguishable from each other in a cross-sectional view. For the purpose of discussion and claiming, reference to the oxide 102 layer are references to the oxide cladding, and any reference to the buried oxide layer 158 will be separately called BOX 158. A non-limiting way to identify the ring resonator structure is to visually inspect both the materials present in a cross-sectional view and the structure and shape of the materials to determine that the ring resonator structure has been implemented. Although, in various embodiments, the ring resonator structure may comprise the same materials as a CMOS component, the structure of the ring resonator structure, and its shape employ different doping profiles than a CMOS component. Various embodiments of the ring resonator structure may have a thickness (on a cross-sectional view) of about 220 nanometers. In various embodiments, the ring resonator structure may be located on a silicon-on-insulator (SOI) wafer, and the substrate 152 is silicon.

A heater 120 may be integrated within the micro-ring structure 104, to enhance thermal tuning of the ring resonator structure. Embodiments of the heater 120 have various orientations and shapes that are outside the scope of this description; therefore, for the purpose of this description, metal heater contacts 108-1 and 108-2, associated with a heater for the micro-ring structure 104 are instead referenced hereon. In various embodiments, heater contacts 108-1 and 108-2 may be alternately referred to as tungsten posts. In the illustrated embodiment, the heater contacts 108-1 and 108-2 are located laterally (or horizontally) in FIG. 1A, from right to left in the micro-ring structure 104. As described in further detail in connection with FIG. 2A-6B, the heater contacts may have attached thereto respective heater traces. The heater traces are metal traces for the micro-ring structure and are a subset of the communication traces described herein.

The micro-ring structure 104 also may have associated therewith one or more additional metal contacts for electrical communication, indicated as metal contact 110 and metal contact 112. In various embodiments, metal contact 110 and metal contact 112 may be tungsten aluminum, titanium, or cobalt. In the illustrated embodiment, the metal contact 110 and metal contact 112 are located vertically within the micro-ring structure 104, substantially perpendicular to line A-A'. A metal trace may be conductively coupled to a metal contact (110, 112). Conductively coupled objects are connected by one or more metal traces, vias, and/or contacts (e.g., by soldering or adhesive). In some embodiments, metal contact 110 can be for a signal, and metal contact 112 can be for ground. In other embodiments, metal contact 110 can be for a ground, and metal contact 112 can be for a signal.

Specific communication trace routing arrangements and their effect on the thermal insulation provided by the air cavity 114 are discussed in further detail below, however the air cavity 114 generally comprises a trench portion 154 that is open to an upper surface 130 of the oxide layer, and a bridge portion 156 that does not open to the upper surface 130, the bridge portion being used for signal routing. Generally, a bridge portion 156 (as depicted in FIG. 1B and the cross-sectional view depicted in FIG. 1C) is a location in which at least some of the oxide layer 102 remains over the air cavity 114 to support communication traces. Said differently, for a communication trace to be supported, a bridge portion 156 is present.

FIGS. 2A-2B are illustrations depicting a signal routing for the ring resonator structure of FIG. 1A, as may be found in available solutions. As is illustrated, there is a one-to-one relationship between communication traces and bridge portions. Heater trace 202 traverses the structure 200 from the left side to heater contact 108-2 and heater trace 205 traverses the structure 200 from the right side to heater contact 108-1; heater trace 202 and heater trace 205 are substantially medial (along line A-A') to the structure 200 and substantially colinear. In this arrangement, neither the heater trace 202 nor the heater trace 205 cross over a silicon waveguide, the metal signal trace 206 crosses over the silicon waveguide 106-2 and the metal ground trace 208 does not cross over a silicon waveguide. As structure 250 (FIG. 2B) illustrates, implementing this signal routing requires the air cavity 114 to have seven bridge portions: bridge portions 210-1, 210-2, 210-3 210-4, 210-5, 210-6, and 210-7. These seven bridge portions create seven distinct air trench portions (air trenches): 204-1, 204-2, 204-3, 204-4, 204-5, 204-6, and 204-7.

As illustrated in connection with FIGS. 3A-6B, provided embodiments of the structure advantageously accomplish the communication trace routing for the micro-ring structure 104 using fewer bridge portions. Embodiments reserve one bridge portion for use as a signal trace, not routing the signal trace over a silicon waveguide. By not routing the signal trace over a silicon waveguide, the structure avoids possible interference between the radio frequency (RF) signal on the signal trace and optical communication (a light wave) propagating in the silicon waveguide. Examples and discussion follow.

FIGS. 3A-3C are illustrations depicting an improvement to the communication trace routing for the ring resonator structure of FIG. 1A, in accordance with various embodiments. In these illustrations, the locations of the heater contacts 108-1 and 108-2 and the locations of the metal contact 110 and the metal contact 112 are the same as in FIG. 2A, however, metal traces are located over/above silicon waveguides (the cross-sectional views provide context for the signal traces being above the silicon waveguides) as follows. In FIG. 3C, the heater traces 314 and 312 are located above silicon waveguide 106-2 as follows: heater trace 314 traverses structure 300 from left to right, above and colinear across a portion of silicon waveguide 106-2, sharing bridge portion 320, then turns upward and is routed to heater contact 108-2. Heater trace 312 traverses silicon waveguide 106-2 from right to left, also above and colinear across a (different) portion of silicon waveguide 106-2, sharing bridge portion 322, then turns upward and is routed to heater contact 108-1.

Metal contact 112 is routed with metal trace 310 (e.g., ground) away from the micro-ring structure 104 to the upper left and routed to the left, above and colinear with the silicon waveguide 106-1, sharing bridge portion 324, and in parallel with the silicon waveguide 106-2. Metal contact 110 is routed with metal trace 316 (e.g., signal trace) away from the micro-ring structure 104 to the upper right, and routed to the right, above and colinear with the silicon waveguide 106-1, in parallel with the silicon waveguide 106-2, but in an area in which it is not over a silicon waveguide, so bridge portion 326 supports metal trace 316 alone, and metal trace 316 can be used as a signal trace. FIG. 3B illustrates that the new location of heater trace 314 and heater trace 312 remove a requirement for medially located bridge portions (210-2 and 210-6 of the scenario of FIG. 2B) instead, as FIG. 3C illustrates, the heater trace 314 and the heater trace 312 are overlaid above the silicon waveguide (with a portion of the oxide layer 102 intervening) and are thereby able to share respective bridge portions (320, 322).

Comparing FIGS. 2B and 3A, it is illustrated that the provided embodiment reduces the number of bridge portions to four: 320, 322, 324, and 326. This embodiment results in fewer air trenches, now only having four: 302, 304, 306, and 308. A significance of this embodiment is that the respective air trenches have a larger size than the air trenches of FIG. 2B. The larger size translates to more substrate open to the upper surface 130 of the oxide layer 102, which translates to less heat dissipation capability per same overall air cavity 114 area.

FIGS. 4A-6B are illustrations depicting alternative signal routing options, as a function of a location of heater contacts (108-1, 108-2) and metal contacts (110, 112) within a micro-ring structure 104 of the ring resonator structure, in accordance with various embodiments. While various embodiments are depicted, supporting various routing options, each of them only employs four bridge portions, and therefore, each of them enables the air cavity 114 to have four air trenches. Further, each of them reserves bridge 326 for the metal trace 316 to be a signal trace.

In FIG. 4A, a line A-A' medially separates an upper half and a lower half of the micro-ring structure 104 in a structure 400. The heater contacts 108-1, 108-2 are located on the lower half of the micro-ring structure 104, and the metal contacts 110, 112 are located on the upper half of the micro-ring structure 104. Similar to FIG. 3A, the heater traces 312 and 314 are routed down from heater contacts 108-1 and 108-2 and share bridge portions 320 and 322 respectively. Also similar to FIG. 3A, metal contact 112 is routed with metal trace 310 away from the micro-ring structure 104 to the upper left and routed to the left, above and colinear with the silicon waveguide 106-1, sharing bridge portion 324, and in parallel with the silicon waveguide 106-2. Metal contact 110 is routed with metal signal trace 316 away from the micro-ring structure 104 to the upper right, and routed to the right, above and colinear with the silicon waveguide 106-1, in parallel with the silicon waveguide 106-2, but in an area in which it is not over a silicon waveguide, so bridge portion 326 supports metal trace 316 alone.

In FIG. 4B, a vertical line C-C' separates a left half and a right half of the micro-ring structure 104 in a structure 450. The heater contacts 108-1, 108-2 are oriented vertically, located on the line C-C', and the metal contacts 110, 112 straddle the line C-C'. Again, similar to FIGS. 3A and 4A, the heater trace 314 is routed from heater contact 108-1 to share bridge portion 320 over a portion of the silicon waveguide 106-2 and heater trace 312 is routed from heater contact 108-2 to share bridge portion 322 over a separate portion of silicon waveguide 106-2. Also similar to FIG. 3A, metal contact 112 is routed with metal trace 310 away from the micro-ring structure 104 to the upper left and routed to the left, above and colinear with the silicon waveguide 106-1, sharing bridge portion 324, and in parallel with the silicon waveguide 106-2. Metal contact 110 is routed with metal signal trace 316 away from the micro-ring structure 104 to the upper right, and routed to the right, above and colinear with the silicon waveguide 106-1, in parallel with the silicon waveguide 106-2, but in an area in which it is not over a silicon waveguide, so bridge portion 326 supports metal trace 316 alone.

In FIG. 5A, a line A-A' separates an upper half and a lower half of the micro-ring structure 104 in a structure 500. The heater contacts 108-1, 108-2 are located on the line A-A', and the metal contacts 110, 112 straddle the line A-A'. FIG. 5A illustrates an embodiment in which heater trace 314 is routed up and to the left, located over silicon waveguide 106-1, sharing bridge portion 324, while heater trace 312 is routed as described in FIG. 4A. The metal trace 310 is routed down and to the left, located over the left portion of silicon waveguide 106-2, sharing bridge portion 320, and metal trace 316 is routed as described in FIG. 4A.

FIG. 5B the heater contacts 108-1, 108-2 are located on a line D-D' that is perpendicular to the silicon waveguides. In this example embodiment, in a structure 550, the line D-D' is shown on a left half of the micro-ring structure 104 and the metal contacts 110, 112, are located to the right of the line D-D'. However, in other embodiments, a line drawn through the heater contacts 108-1 and 108-2 can be on the right, on the upper half, or on the lower half, of the micro-ring structure 104. Again, similar to FIGS. 3A and 4A, the heater trace 314 is routed from heater contact 108-1 to share bridge portion 320 over a portion of the silicon waveguide 106-2 and heater trace 312 is routed from heater contact 108-2 to share bridge portion 322 over a separate portion of silicon waveguide 106-2. Also similar to FIG. 3A, metal contact 112 is routed with metal trace 310 away from the micro-ring structure 104 to the upper left and routed to the left, above and colinear with the silicon waveguide 106-1, sharing bridge portion 324, and in parallel with the silicon waveguide 106-2. Metal contact 110 is routed with metal trace 316 (e.g., signal trace) away from the micro-ring structure 104 to the upper right, and routed to the right, above and colinear with the silicon waveguide 106-1, in parallel with the silicon waveguide 106-2, but in an area in which it is not over a silicon waveguide, so bridge portion 326 supports metal trace 316 alone.

In FIGS. 6A, and 6B, similar to FIG. 4B, the heater contacts 108-1, 108-2 are located on the line C-C', which is perpendicular to the silicon waveguides 106-1 and 106-2, and there are two or more metal contacts 110, and two or more metal contacts 112. In practice, this represents multiple signal contacts and multiple ground contacts. In embodiment 600, the two or more metal contacts 112 (112-1, 112-2) are operationally connected and routed upward and to the left above silicon waveguide 106-1 on bridge portion 324 (e.g., for use as grounds on a ground trace), and the two or more metal contacts 110 (110-1, 110-2) are operationally connected and routed upward and to the right on bridge portion 326, for use as signals on a signal trace. The heater contact 108-1 is routed down and left on bridge portion 320 and the heater contact 108-2 is routed down and right on bridge portion 322. As can be seen in embodiment 600, the metal contacts 110 are on one side of the line C-C', and the metal contacts 112 are on a second side of the line C-C'. In contrast, in embodiment 650, metal contact 110-1 is on a first side of the line C-C' and the second metal contact 110-2 is on a second side of the line C-C'; similarly, metal contact 112-1 is on the first side of the line C-C' and the second metal contact 112-2 is on the second side of the line C-C'.

Accordingly, various non-limiting embodiments of the structure have been described. The provided embodiments reduce the number of bridge portions required for the communication traces to the micro-ring structure 104. Embodiments reserve one of the bridge portions for use as a signal trace. As a function of reduced bridge portions, embodiments advantageously reduce the heat lost through bridge portions such that the thermal efficiency of the integrated heater in ring resonator structure can be improved. This invention will significantly increase the power efficiency of the ring resonator structure in a regular PIC or in an OCPIC (Open-Cavity Photonic Integrated Chip).

Turning now to FIG. 7, a PIC having the provided structure is implemented as an OCPIC in an application. A multi-die integrated circuit component can be referred to as a multi-chip package (MCP) or, alternatively, a multi-chip module (MCM). FIG. 7 is a simplified cross-sectional side view of an exemplary multi-chip package (MCP) 700 that includes an OCPIC 702, in accordance with various embodiments. The MCP 700 may comprise one or more processor units, CPUs, graphics processors, or FPGAs, as represented by electronic integrated circuit (EIC) 704, and integrated circuit 706. In addition, the MCP 700 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets."

In some embodiments, the OCPIC 702 chiplet is embedded in a MCP package substrate 710 (and the substrate of the OCPIC substrate is distinguished therefrom as PIC substrate, which may or may not be the same as the MCP package substate). In other embodiments, the OCPIC 702 chiplet is attached to a MCP package substrate 710. The OCPIC 702 has an MRR (in practice, the OCPIC 702 has a plurality of MRRs, and the OCPIC further has a respective plurality of structures, as defined hereinabove). The OCPIC 702 is adjacent to the EIC 704 that is configured specifically to receive and process data from the OCPIC 702. In practice, interconnections between the dies and/or chiplets of MCP 700 can be provided by the package substrate 710, one or more silicon interposers, one or more silicon bridges 708 embedded in the package substrate 710 (such as Intel® embedded multi-die interconnect bridges (EMIBs)), or combinations thereof. Silicon bridge 708 is shown to operationally couple the integrated circuit 706 with the electronic integrated circuit 704.

A thermal conduction layer interface material (TIM) 714 may be located over the integrated circuit 706 and the electronic integrated circuit 704. The TIM 714 can be any suitable material, such as a silver-particle filled thermal compound, thermal grease, phase change materials, indium foils or graphite sheets. An integrated heat spreader (IHS) 712, located on the TIM 714, covers the components of the MCP 700. In practice, the MCP 700, and the OCPIC 702 specifically, may communicate with other components in a device (e.g., device 900, FIG. 9) via a fiber array unit (FAU) connector. In various embodiments, the FAU connector may be a top side connector 716, such as a grating coupler, or an edge connector 718, such as a micro-lens or V-groove.

Figure 8:
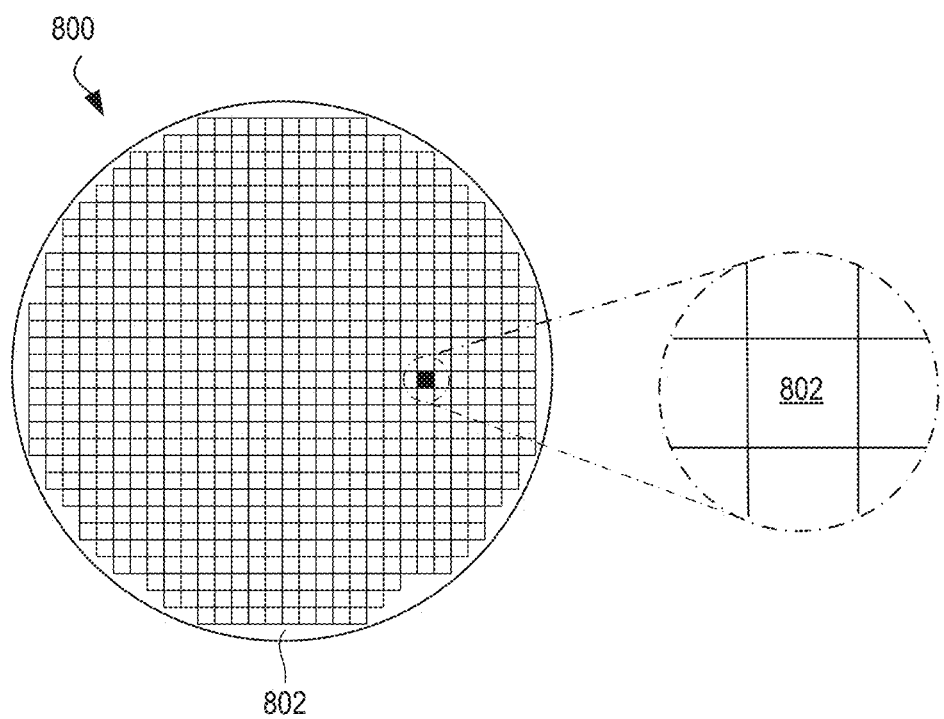
FIG. 8 is a top view of a wafer and dies that may be included in a microelectronic assembly, in accordance with any of the embodiments disclosed herein.

FIG. 8 is a top view of a wafer 800 and dies 802 that may be included in any of the embodiments disclosed herein. The wafer 800 may be composed of semiconductor material and may include one or more dies 802 formed on a surface of the wafer 800. After the fabrication of the integrated circuit components on the wafer 800 is complete, the wafer 800 may undergo a singulation process in which the dies 802 are separated from one another to provide discrete "chips" or destined for a packaged integrated circuit component. The individual dies 802, comprising an integrated circuit component, may include one or more transistors (e.g., some of the transistors 940 of FIG. 9, discussed below), supporting circuitry to route electrical signals to the transistors, passive components (e.g., signal traces, resistors, capacitors, or inductors), and/or any other integrated circuit components. In some embodiments, the wafer 800 or the die 802 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Additionally, multiple devices may be combined on a single die 802. For example, a memory array formed by multiple memory devices may be formed on a same die 802 as a processor unit (e.g., the processor unit 1102 of FIG. 11) or other logic that is configured to store information in the memory devices or execute instructions stored in the memory array. In some embodiments, a die 802 may be attached to a wafer 800 that includes other die, and the wafer 800 is subsequently singulated, this manufacturing procedure is referred to as a die-to-wafer assembly technique.

Figure 9:
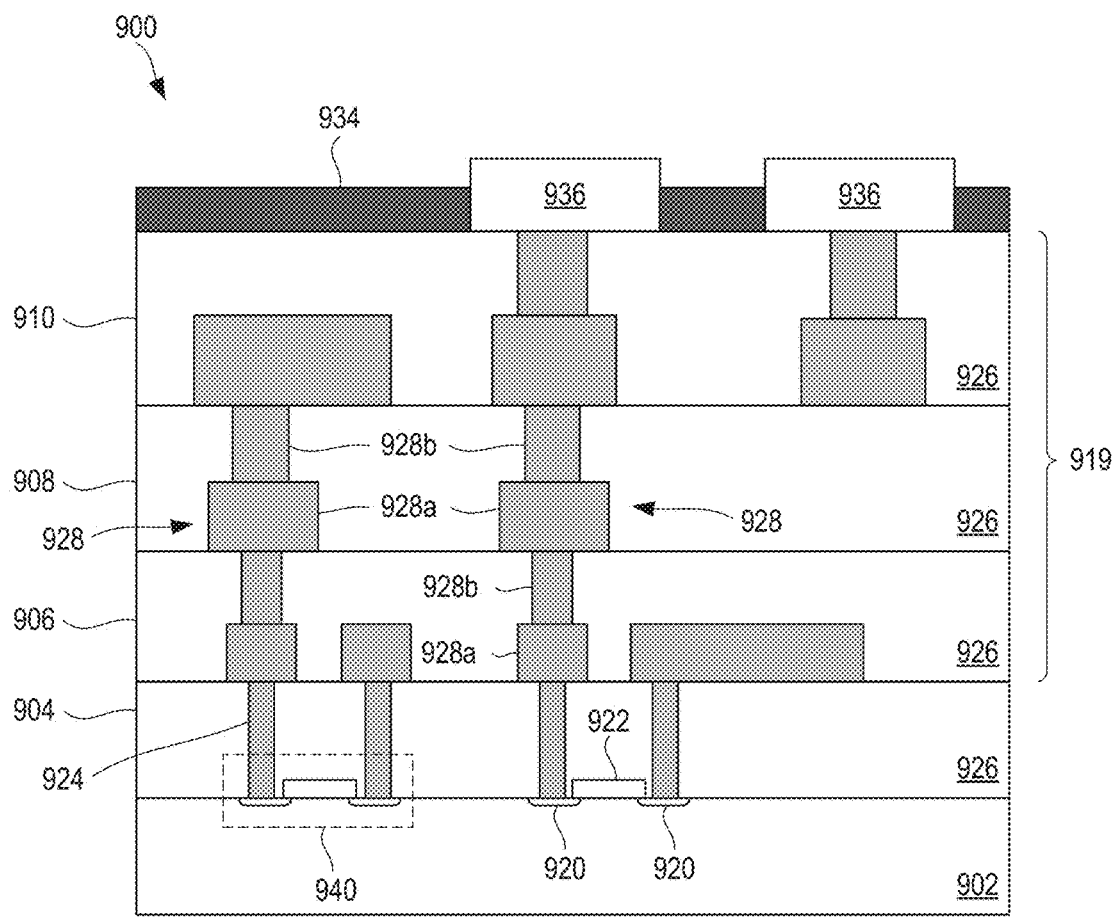
FIG. 9 is a simplified cross-sectional side view showing an implementation of an integrated circuit on a die that may be included in various embodiments, in accordance with any of the embodiments disclosed herein.

FIG. 9 is a cross-sectional side view of an integrated circuit 900 that may be included in any of the embodiments disclosed herein. One or more of the integrated circuits 900 may be included in one or more dies 802 (FIG. 8). The integrated circuit 900 may be formed on a die substrate 902 (e.g., the wafer 800 of FIG. 8) and may be included in a die (e.g., the die 802 of FIG. 8).

The die substrate 902 may be a semiconductor substrate composed of semiconductor material systems including, for example, n-type or p-type materials systems (or a combination of both). The die substrate 902 may include, for example, a crystalline substrate formed using a bulk silicon or a silicon-on-insulator (SOI) substructure. In some embodiments, the die substrate 902 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 902. Although a few examples of materials from which the die substrate 902 may be formed are described here, any material that may serve as a foundation for an integrated circuit 900 may be used. The die substrate 902 may be part of a singulated die (e.g., the dies 802 of FIG. 8) or a wafer (e.g., the wafer 800 of FIG. 8).

The integrated circuit 900 may include one or more device layers 904 disposed on the die substrate 902. The device layer 904 may include features of one or more transistors 940 (e.g., metal oxide semiconductor field-effect transistors (MOSFETs)) formed on the die substrate 902. The transistors 940 may include, for example, one or more source and/or drain (S/D) regions 920, a gate 922 to control current flow between the S/D regions 920, and one or more S/D contacts 924 to route electrical signals to/from the S/D regions 920.

The gate 922 may be formed of at least two layers, a gate dielectric and a gate electrode. The gate dielectric may include one layer or a stack of layers. The one or more layers may include silicon oxide, silicon dioxide, silicon carbide, and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be conducted on the gate dielectric to improve its quality when a high-k material is used.

The gate electrode may be formed on the gate dielectric and may include at least one p-type work function metal or n-type work function metal, depending on whether the transistor 940 is to be a p-type metal oxide semiconductor (PMOS) or an n-type metal oxide semiconductor (NMOS) transistor. In some implementations, the gate electrode may comprise a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 940 along the source-channel-drain direction, the gate electrode may comprise a U-shaped structure that includes a bottom portion substantially parallel to the surface of the die substrate 902 and two sidewall portions that are substantially perpendicular to the top surface of the die substrate 902. In other embodiments, at least one of the metal layers that form the gate electrode may simply be a planar layer that is substantially parallel to the top surface of the die substrate 902 and does not include sidewall portions substantially perpendicular to the top surface of the die substrate 902. In other embodiments, the gate electrode may comprise a combination of U-shaped structures and planar, non-U-shaped structures. For example, the gate electrode may comprise one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 920 may be formed within the die substrate 902 adjacent to the gate 922 of individual transistors 940. The S/D regions 920 may be formed using an implantation/diffusion process or an etching/deposition process, for example. In the former process, dopants such as boron, aluminum, antimony, phosphorous, or arsenic may be ion-implanted into the die substrate 902 to form the S/D regions 920. An annealing process that activates the dopants and causes them to diffuse farther into the die substrate 902 may follow the ion-implantation process. In the latter process, the die substrate 902 may first be etched to form recesses at the locations of the S/D regions 920. An epitaxial deposition process may then be conducted to fill the recesses with material that is used to fabricate the S/D regions 920. In some implementations, the S/D regions 920 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 920 may be formed using one or more alternate semiconductor materials such as germanium or a group III-V material or alloy. In further embodiments, one or more layers of metal and/or metal alloys may be used to form the S/D regions 920.

Electrical signals, such as power and/or input/output (I/O) signals, may be routed to and/or from the devices (e.g., transistors 940) of the device layer 904 through one or more interconnect layers disposed on the device layer 904 (illustrated in FIG. 9 as interconnect layers 906-910). For example, electrically conductive features of the device layer 904 (e.g., the gate 922 and the S/D contacts 924) may be electrically coupled with the interconnect structures 928 of the interconnect layers 906-910. The one or more interconnect layers 906-910 may form a metallization stack (also referred to as an "ILD stack") 919 of the integrated circuit 900.

The interconnect structures 928 may be arranged within the interconnect layers 906-910 to route electrical signals according to a wide variety of designs; in particular, the arrangement is not limited to the particular configuration of interconnect structures 928 depicted in FIG. 9. Although a particular number of interconnect layers 906-910 is depicted in FIG. 9, embodiments of the present disclosure include integrated circuits having more or fewer interconnect layers than depicted.

In some embodiments, the interconnect structures 928 may include lines 928a and/or vias 928b filled with an electrically conductive material such as a metal. The lines 928a may be arranged to route electrical signals in a direction of a plane that is substantially parallel with a surface of the die substrate 902 upon which the device layer 904 is formed. For example, the lines 928a may route electrical signals in a direction in and out of the page and/or in a direction across the page. The vias 928b may be arranged to route electrical signals in a direction of a plane that is substantially perpendicular to the surface of the die substrate 902 upon which the device layer 904 is formed. In some embodiments, the vias 928b may electrically couple lines 928a of different interconnect layers 906-910 together.

The interconnect layers 906-910 may include a dielectric material 926 disposed between the interconnect structures 928, as shown in FIG. 9. In some embodiments, dielectric material 926 disposed between the interconnect structures 928 in different ones of the interconnect layers 906-910 may have different compositions; in other embodiments, the composition of the dielectric material 926 between different interconnect layers 906-910 may be the same. The device layer 904 may include a dielectric material 926 disposed between the transistors 940 and a bottom layer of the metallization stack as well. The dielectric material 926 included in the device layer 904 may have a different composition than the dielectric material 926 included in the interconnect layers 906-910; in other embodiments, the composition of the dielectric material 926 in the device layer 904 may be the same as a dielectric material 926 included in any one of the interconnect layers 906-910.

A first interconnect layer 906 (referred to as Metal 1 or "M1") may be formed directly on the device layer 904. In some embodiments, the first interconnect layer 906 may include lines 928a and/or vias 928b, as shown. The lines 928a of the first interconnect layer 906 may be coupled with contacts (e.g., the S/D contacts 924) of the device layer 904. The vias 928b of the first interconnect layer 906 may be coupled with the lines 928a of a second interconnect layer 908.

The second interconnect layer 908 (referred to as Metal 2 or "M2") may be formed directly on the first interconnect layer 906. In some embodiments, the second interconnect layer 908 may include via 928b to couple the lines 928 of the second interconnect layer 908 with the lines 928a of a third interconnect layer 910. Although the lines 928a and the vias 928b are structurally delineated with a line within individual interconnect layers for the sake of clarity, the lines 928a and the vias 928b may be structurally and/or materially contiguous (e.g., simultaneously filled during a dual-damascene process) in some embodiments.

The third interconnect layer 910 (referred to as Metal 3 or "M3") (and additional interconnect layers, as desired) may be formed in succession on the second interconnect layer 908 according to similar techniques and configurations described in connection with the second interconnect layer 908 or the first interconnect layer 906. In some embodiments, the interconnect layers that are "higher up" in the metallization stack 919 in the integrated circuit 900 (i.e., farther away from the device layer 904) may be thicker that the interconnect layers that are lower in the metallization stack 919, with lines 928a and vias 928b in the higher interconnect layers being thicker than those in the lower interconnect layers.

The integrated circuit 900 may include a solder resist material 934 (e.g., polyimide or similar material) and one or more conductive contacts 936 formed on the interconnect layers 906-910. In FIG. 9, the conductive contacts 936 are illustrated as taking the form of bond pads. The conductive contacts 936 may be electrically coupled with the interconnect structures 928 and configured to route the electrical signals of the transistor(s) 940 to external devices. For example, solder bonds may be formed on the one or more conductive contacts 936 to mechanically and/or electrically couple an integrated circuit die including the integrated circuit 900 with another component (e.g., a printed circuit board). The integrated circuit 900 may include additional or alternate structures to route the electrical signals from the interconnect layers 906-910; for example, the conductive contacts 936 may include other analogous features (e.g., posts) that route the electrical signals to external components.

In some embodiments in which the integrated circuit 900 is a double-sided die, the integrated circuit 900 may include another metallization stack (not shown) on the opposite side of the device layer(s) 904. This metallization stack may include multiple interconnect layers as discussed above with reference to the interconnect layers 906-910, to provide conductive pathways (e.g., including conductive lines and vias) between the device layer(s) 904 and additional conductive contacts (not shown) on the opposite side of the integrated circuit 900 from the conductive contacts 936.

In other embodiments in which the integrated circuit 900 is a double-sided die, the integrated circuit 900 may include one or more through silicon vias (TSVs) through the die substrate 902; these TSVs may make contact with the device layer(s) 904, and may provide conductive pathways between the device layer(s) 904 and additional conductive contacts (not shown) on the opposite side of the integrated circuit 900 from the conductive contacts 936. In some embodiments, TSVs extending through the substrate can be used for routing power and ground signals from conductive contacts on the opposite side of the integrated circuit 900 from the conductive contacts 936 to the transistors 940 and any other components integrated into the die 900, and the metallization stack 919 can be used to route I/O signals from the conductive contacts 936 to transistors 940 and any other components integrated into the die 900.

Multiple integrated circuits 900 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 10:
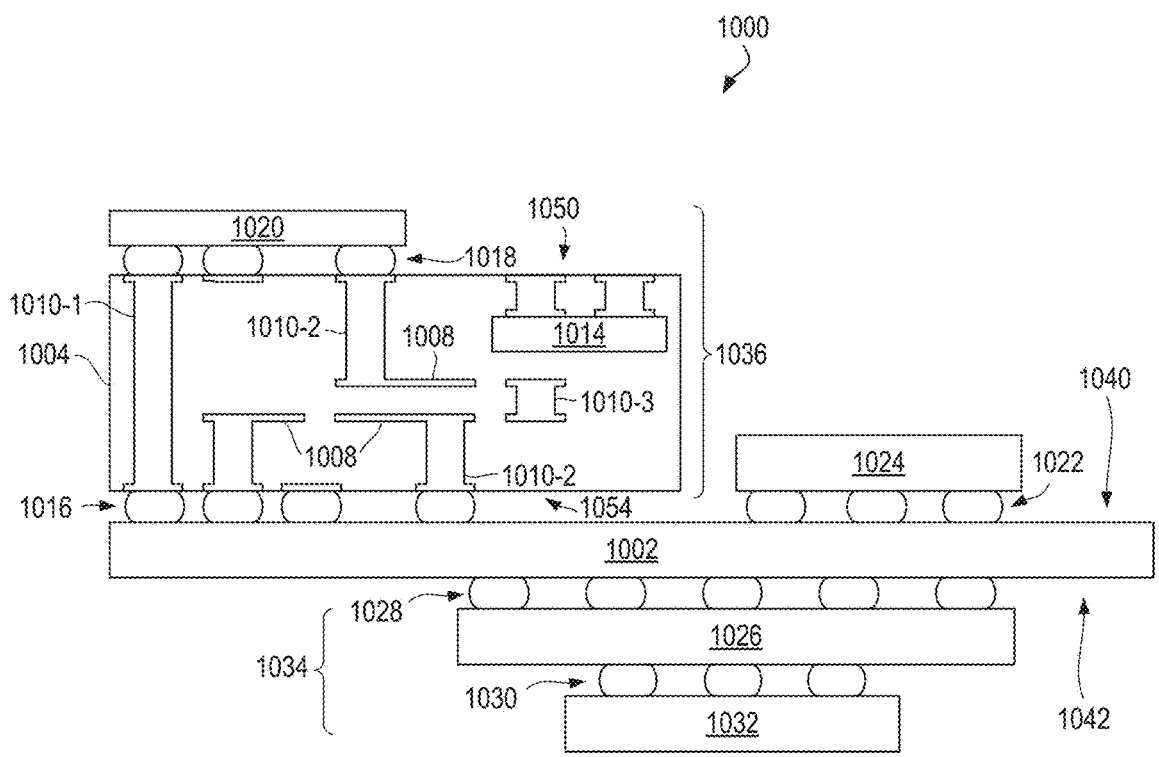
FIG. 10 is a cross-sectional side view of a microelectronic assembly that may include any of the embodiments disclosed herein.

FIG. 10 is a cross-sectional side view of a microelectronic assembly 1000 that may include any of the embodiments disclosed herein. The microelectronic assembly 1000 includes multiple integrated circuit components disposed on a circuit board 1002 (which may be a motherboard, system board, mainboard, etc.). The microelectronic assembly 1000 may include components disposed on a first face 1040 of the circuit board 1002 and an opposing second face 1042 of the circuit board 1002; generally, components may be disposed on one or both faces 1040 and 1042.

In some embodiments, the circuit board 1002 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 1002. In other embodiments, the circuit board 1002 may be a non-PCB substrate. The microelectronic assembly 1000 illustrated in FIG. 10 includes a package-on-interposer structure 1036 coupled to the first face 1040 of the circuit board 1002 by coupling components 1016. The coupling components 1016 may electrically and mechanically couple the package-on-interposer structure 1036 to the circuit board 1002, and may include solder balls (as shown in FIG. 10), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 1036 may include an integrated circuit component 1020 coupled to an interposer 1004 by coupling components 1018. The coupling components 1018 may take any suitable form for the application, such as the forms discussed above with reference to the coupling components 1016. Although a single integrated circuit component 1020 is shown in FIG. 10, multiple integrated circuit components may be coupled to the interposer 1004; indeed, additional interposers may be coupled to the interposer 1004. The interposer 1004 may provide an intervening substrate used to bridge the circuit board 1002 and the integrated circuit component 1020.

The integrated circuit component 1020 may be a packaged or unpackaged integrated circuit component that includes one or more integrated circuit dies (e.g., the die 802 of FIG. 8, the integrated circuit 900 of FIG. 9) and/or one or more other suitable components.

The unpackaged integrated circuit component 1020 comprises solder bumps attached to contacts on the die. The solder bumps allow the die to be directly attached to the interposer 1004. In embodiments where the integrated circuit component 1020 comprises multiple integrated circuit dies, the dies can be of the same type (a homogeneous multi-die integrated circuit component) or of two or more different types (a heterogeneous multi-die integrated circuit component). In addition to comprising one or more processor units, the integrated circuit component 1020 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof. A packaged multi-die integrated circuit component can be referred to as a multi-chip package (MCP) or multi-chip module (MCM).

Generally, the interposer 1004 may spread connections to a wider pitch or reroute a connection to a different connection. For example, the interposer 1004 may couple the integrated circuit component 1020 to a set of ball grid array (BGA) conductive contacts of the coupling components 1016 for coupling to the circuit board 1002. In the embodiment illustrated in FIG. 10, the integrated circuit component 1020 and the circuit board 1002 are attached to opposing sides of the interposer 1004; in other embodiments, the integrated circuit component 1020 and the circuit board 1002 may be attached to a same side of the interposer 1004. In some embodiments, three or more components may be interconnected by way of the interposer 1004.

In some embodiments, the interposer 1004 may be formed as a PCB, including multiple metal layers separated from one another by layers of dielectric material and interconnected by electrically conductive vias. In some embodiments, the interposer 1004 may be formed of an epoxy resin, a fiberglass-reinforced epoxy resin, an epoxy resin with inorganic fillers, a ceramic material, or a polymer material such as polyimide. In some embodiments, the interposer 1004 may be formed of alternate rigid or flexible materials that may include the same materials described above for use in a semiconductor substrate, such as silicon, germanium, and other group III-V and group IV materials. The interposer 1004 may include metal interconnects 1008 and vias 1010, including but not limited to through hole vias 1010-1 (that extend from a first face 1050 of the interposer 1004 to a second face 1054 of the interposer 1004), blind vias 1010-2 (that extend from the first or second faces 1050 or 1054 of the interposer 1004 to an internal metal layer), and buried vias 1010-3 (that connect internal metal layers).

In some embodiments, the interposer 1004 can comprise a silicon interposer. Through silicon vias (TSV) extending through the silicon interposer can connect connections on a first face of a silicon interposer to an opposing second face of the silicon interposer. In some embodiments, an interposer 1004 comprising a silicon interposer can further comprise one or more routing layers to route connections on a first face of the interposer 1004 to an opposing second face of the interposer 1004.

The interposer 1004 may further include embedded devices 1014, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1004. The package-on-interposer structure 1036 may take the form of any of the package-on-interposer structures known in the art. In embodiments where the interposer is a non-printed circuit board The integrated circuit assembly 1000 may include an integrated circuit component 1024 coupled to the first face 1040 of the circuit board 1002 by coupling components 1022. The coupling components 1022 may take the form of any of the embodiments discussed above with reference to the coupling components 1016, and the integrated circuit component 1024 may take the form of any of the embodiments discussed above with reference to the integrated circuit component 1020.

The integrated circuit assembly 1000 illustrated in FIG. 10 includes a package-on-package structure 1034 coupled to the second face 1042 of the circuit board 1002 by coupling components 1028. The package-on-package structure 1034 may include an integrated circuit component 1026 and an integrated circuit component 1032 coupled together by coupling components 1030 such that the integrated circuit component 1026 is disposed between the circuit board 1002 and the integrated circuit component 1032. The coupling components 1028 and 1030 may take the form of any of the embodiments of the coupling components 1016 discussed above, and the integrated circuit components 1026 and 1032 may take the form of any of the embodiments of the integrated circuit component 1020 discussed above. The package-on-package structure 1034 may be configured in accordance with any of the package-on-package structures known in the art.

Figure 11:
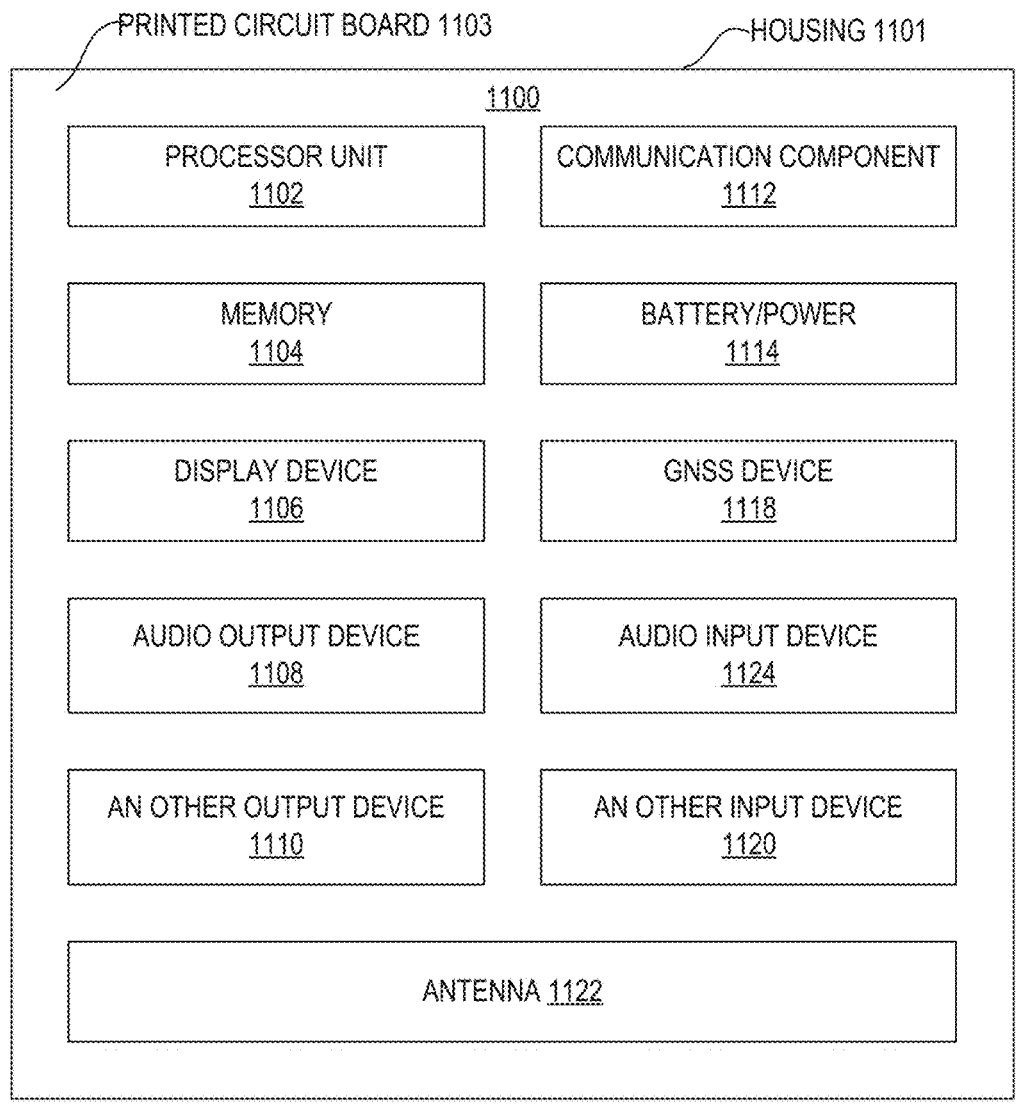
FIG. 11 is a block diagram of an example electrical device that may include any of the embodiments disclosed herein.

FIG. 11 is a block diagram of an example electrical device 1100 that may include one or more of the embodiments disclosed herein. For example, any suitable ones of the components of the electrical device 1100 may include one or more of the microelectronic assemblies 1000, integrated circuit components 1020, integrated circuits 900, integrated circuit dies 802, or structures disclosed herein. A number of components are illustrated in FIG. 11 as included in the electrical device 1100, but any one or more of these components may be omitted or duplicated, as suitable for the application. In some embodiments, some or all of the components included in the electrical device 1100 may be attached to one or more motherboards, mainboards, printed circuit boards 1103, or system boards. In some embodiments, one or more of these components are fabricated onto a single system-on-a-chip (SoC) die. In various embodiments, the electrical device 1100 is enclosed by, or integrated with, a housing 1101.

Additionally, in various embodiments, the electrical device 1100 may not include one or more of the components illustrated in FIG. 11, but the electrical device 1100 may include interface circuitry for coupling to the one or more components. For example, the electrical device 1100 may not include a display device 1106, but may include display device interface circuitry (e.g., a connector and driver circuitry) to which a display device 1106 may be coupled. In another set of examples, the electrical device 1100 may not include an audio input device 1124 or an audio output device 1108, but may include audio input or output device interface circuitry (e.g., connectors and supporting circuitry) to which an audio input device 1124 or audio output device 1108 may be coupled.

The electrical device 1100 may include one or more processor units 1102 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 1102 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller crypto processors (specialized processors that execute cryptographic algorithms within hardware), server processors, controllers, or any other suitable type of processor units. As such, the processor unit can be referred to as an XPU (or xPU).

The electrical device 1100 may include a memory 1104, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 1104 may include memory that is located on the same integrated circuit die as the processor unit 1102. This memory may be used as cache memory (e.g., Level 1 (L1), Level 2 (L2), Level 3 (L3), Level 4 (L4), Last Level Cache (LLC)) and may include embedded dynamic random-access memory (eDRAM) or spin transfer torque magnetic random-access memory (STT-MRAM).

In some embodiments, the electrical device 1100 can comprise one or more processor units 1102 that are heterogeneous or asymmetric to another processor unit 1102 in the electrical device 1100. There can be a variety of differences between the processing units 1102 in a system in terms of a spectrum of metrics of merit including architectural, micro-architectural, thermal, power consumption characteristics, and the like. These differences can effectively manifest themselves as asymmetry and heterogeneity among the processor units 1102 in the electrical device 1100.

In some embodiments, the electrical device 1100 may include a communication component 1112 (e.g., one or more communication components). For example, the communication component 1112 can manage wireless communications for the transfer of data to and from the electrical device 1100. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 1112 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 1112 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 1112 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 1112 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 1112 may operate in accordance with other wireless protocols in other embodiments. The electrical device 1100 may include an antenna 1122 to facilitate wireless communications and/or to receive other wireless communications (such as AM or FM radio transmissions).

In some embodiments, the communication component 1112 may manage wired communications, such as electrical, optical, or any other suitable communication protocols (e.g., IEEE 802.3 Ethernet standards). As noted above, the communication component 1112 may include multiple communication components. For instance, a first communication component 1112 may be dedicated to shorter-range wireless communications such as Wi-Fi or Bluetooth, and a second communication component 1112 may be dedicated to longer-range wireless communications such as global positioning system (GPS), EDGE, GPRS, CDMA, WiMAX, LTE, EV-DO, or others. In some embodiments, a first communication component 1112 may be dedicated to wireless communications, and a second communication component 1112 may be dedicated to wired communications.

The electrical device 1100 may include battery/power circuitry 1114. The battery/power circuitry 1114 may include one or more energy storage devices (e.g., batteries or capacitors) and/or circuitry for coupling components of the electrical device 1100 to an energy source separate from the electrical device 1100 (e.g., AC line power).

The electrical device 1100 may include a display device 1106 (or corresponding interface circuitry, as discussed above). The display device 1106 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 1100 may include an audio output device 1108 (or corresponding interface circuitry, as discussed above). The audio output device 1108 may include any embedded or wired or wirelessly connected external device that generates an audible indicator, such speakers, headsets, or earbuds.

The electrical device 1100 may include an audio input device 1124 (or corresponding interface circuitry, as discussed above). The audio input device 1124 may include any embedded or wired or wirelessly connected device that generates a signal representative of a sound, such as microphones, microphone arrays, or digital instruments (e.g., instruments having a musical instrument digital interface (MIDI) output). The electrical device 1100 may include a Global Navigation Satellite System (GNSS) device 1118 (or corresponding interface circuitry, as discussed above), such as a Global Positioning System (GPS) device. The GNSS device 1118 may be in communication with a satellite-based system and may determine a geolocation of the electrical device 1100 based on information received from one or more GNSS satellites, as known in the art.

The electrical device 1100 may include another output device 1110 (or corresponding interface circuitry, as discussed above). Examples of the other output device 1110 may include an audio codec, a video codec, a printer, a wired or wireless transmitter for providing information to other devices, or an additional storage device.

The electrical device 1100 may include another input device 1120 (or corresponding interface circuitry, as discussed above). Examples of the other input device 1120 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 1100 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra-mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 1100 may be any other electronic device that processes data. In some embodiments, the electrical device 1100 may comprise multiple discrete physical components. Given the range of devices that the electrical device 1100 can be manifested as in various embodiments, in some embodiments, the electrical device 1100 can be referred to as a computing device or a computing system.

Thus, embodiments of a structure for an open-cavity photonic integrated circuit (OCPIC) having a micro-ring resonator (MRR) have been provided. The provided embodiments advantageously enhance power efficiency of the MRR and the OCPIC. Embodiments enable the use of finer pitch architectures and high-density input/output (I/O) designs without impacting thermal efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

As used herein, phrases such as "an embodiment," "various embodiments," "some embodiments," and the like, indicate that some embodiments may have some, all, or none of the features described for other embodiments. "First," "second," "third," and the like describe a common object and indicate different instances of like objects being referred to; unless specifically stated, they do not imply a given sequence, either temporally or spatially, in ranking, or any other manner. In accordance with patent application parlance, "connected" indicates elements that are in direct physical or electrical contact with each other and "coupled" indicates elements that co-operate or interact with each other, coupled elements may or may not be in direct physical or electrical contact. Furthermore, the terms "comprising," "including," "having," and the like, are utilized synonymously to denote non-exclusive inclusions.

As used in this application and the claims, a list of items joined by the term "at least one of" or the term "one or more of" can mean any combination of the listed terms. For example, the phrase "at least one of A, B or C" can mean A; B; C; A and B; A and C; B and C; or A, B, and C. Likewise, the phrase "one or more of A, B and C" can mean A; B; C; A and B; A and C; B and C; or A, B, and C.

As used in this application and the claims, the phrase "individual of" or "respective of" following by a list of items recited or stated as having a trait, feature, etc. means that all of the items in the list possess the stated or recited trait, feature, etc. For example, the phrase "individual of A, B, or C, comprise a sidewall" or "respective of A, B, or C, comprise a sidewall" means that A comprises a sidewall, B comprises sidewall, and C comprises a sidewall.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

EXAMPLES

Example 1 is a structure, comprising: a substrate; an oxide layer overlaid on the substrate; a ring resonator structure comprising a micro-ring structure and a silicon waveguide, the micro-ring structure located between the substrate and the oxide layer; an air cavity in the substrate surrounding the micro-ring structure, the air cavity comprising a trench portion that is open to an upper surface of the oxide layer, and a bridge portion that does not open to the upper surface of the oxide layer; the silicon waveguide located on the bridge portion: and a metal trace conductively coupled to the micro-ring structure and located above the silicon waveguide on the bridge portion.

Example 2 includes the structure of Example 1, wherein the metal trace is a first metal trace, the bridge portion is a first bridge portion, and further comprising: a second bridge portion in the air cavity; the silicon waveguide extending across the air cavity and further located on the second bridge portion; and a second metal trace conductively coupled to the micro-ring structure and located above the silicon waveguide on the second bridge portion.

Example 3 includes the structure of Example 2, wherein the first bridge portion and the second bridge portion are substantially colinear.

Example 4 includes the structure of Example 2 or Example 3, wherein the first metal trace and the second metal trace are respective heater traces.

Example 5 includes the structure of Example 2 or Example 3, wherein the first metal trace and the second metal trace comprise a heater trace and a ground trace.

Example 6 includes the structure of Example 1, wherein the metal trace is a first metal trace, the bridge portion is a first bridge portion, and further comprising: a second bridge portion in the air cavity, colinear with the first bridge portion; and a second metal trace conductively coupled to the micro-ring structure and located on the second bridge portion.

Example 7 includes the structure of Example 6, wherein the first metal trace and the second metal trace comprise a heater trace and a signal trace.

Example 8 includes the structure of Example 1, wherein the metal trace is a first metal trace, the bridge portion is a first bridge portion, and further comprising: a second bridge portion in the air cavity, parallel with the first bridge portion; and a second metal trace conductively coupled to the micro-ring structure and located on the second bridge portion.

Example 9 includes the structure of Example 8, wherein the first metal trace and the second metal trace comprise a heater trace and a signal trace.

Example 10 includes the structure of Example 8, wherein the first metal trace and the second metal trace comprise a ground trace and a signal trace.

Example 11 includes the structure of Example 1, wherein the metal trace is a first metal trace, the silicon waveguide is a first silicon waveguide, the bridge portion is a first bridge portion, and further comprising: a second bridge portion in the air cavity; a second silicon waveguide located on the second bridge portion; and a second metal trace conductively coupled to the micro-ring structure and located above the second silicon waveguide on the second bridge portion.

Example 12 includes the structure of Example 11, wherein the first metal trace and the second metal trace are respective heater traces.

Example 13 includes the structure of Example 11, wherein the first metal trace and the second metal trace comprise a heater trace and a ground trace Example 14 includes the structure of Example 1, wherein the metal trace is a first metal trace, the silicon waveguide is a first silicon waveguide, the bridge portion is a first bridge portion, and further comprising: a second bridge portion in the air cavity and substantially colinear with the first bridge portion; the silicon waveguide extending across the air cavity and further located on the second bridge portion; a third bridge portion in the air cavity, the third bridge portion substantially parallel with the first bridge portion; a second silicon waveguide located on the third bridge portion; and a second metal trace conductively coupled to the micro-ring structure and located above the first silicon waveguide on the second bridge portion.

Example 15 includes the structure of Example 1, wherein the metal trace is a first metal trace, the silicon waveguide is a first silicon waveguide, the bridge portion is a first bridge portion, and further comprising: a second bridge portion in the air cavity and substantially colinear with the first bridge portion; the silicon waveguide extending across the air cavity and further located on the second bridge portion; a third bridge portion in the air cavity, the third bridge portion substantially parallel with the first bridge portion; a second silicon waveguide located on the third bridge portion; and a second metal trace conductively coupled to the micro-ring structure and located above the second silicon waveguide on the second bridge portion.

Example 16 includes the structure of Example 1, wherein the metal trace is a first metal trace, the bridge portion is a first bridge portion, and further comprising: a second bridge portion in the air cavity and substantially colinear with the first bridge portion; a third bridge portion in the air cavity, the third bridge portion substantially parallel with the first bridge portion; the silicon waveguide extending across the air cavity and further located on the second bridge portion; and a second metal trace conductively coupled to the micro-ring structure and located on the third bridge portion.

Example 17 includes the structure of Example 1, wherein the metal trace is a first metal trace, the silicon waveguide is a first silicon waveguide, the bridge portion is a first bridge portion, and further comprising: a second bridge portion in the air cavity and substantially colinear with the first bridge portion; a third bridge portion and a fourth bridge portion in the air cavity, the third bridge portion and fourth bridge portion being substantially colinear with each other and substantially parallel with the first bridge portion and second bridge portion; the first silicon waveguide extending across the air cavity and further located on the second bridge portion; a second silicon waveguide located on the third bridge portion; a second metal trace conductively coupled to the micro-ring structure and located above the first silicon waveguide on the second bridge portion; a third metal trace conductively coupled to the micro-ring structure and located above the second silicon waveguide on the third bridge portion; and a fourth metal trace conductively coupled to the micro-ring structure and located on the fourth bridge portion.

Example 18 includes the structure of Example 17, wherein the first metal trace is a ground trace, the second metal trace and the third metal trace are respective heater traces, and the fourth metal trace is a signal trace.

Example 19 includes the structure of Example 17, wherein the first metal trace and the second metal trace are respective heater traces, the third metal trace is a ground trace, and the fourth metal trace is a signal trace.

Example 20 is a photonic integrated circuit (PIC), comprising: a substrate; an oxide layer located on the substrate; a ring resonator structure comprising a micro-ring structure and a silicon waveguide, the ring resonator structure located between the substrate and the oxide layer; an air cavity in the substrate surrounding the micro-ring structure, the air cavity comprising a trench portion that is open to an upper surface of the oxide layer, and a bridge portion that does not open to the upper surface; the silicon waveguide located on the bridge portion; and a metal trace conductively coupled to the micro-ring structure and located above the silicon waveguide on the bridge portion.

Example 21 includes the PIC of Example 20, wherein the metal trace is a first metal trace, the bridge portion is a first bridge portion, and further comprising: a second bridge portion in the air cavity; the silicon waveguide extending across the air cavity and further located on the second bridge portion; and a second metal trace conductively coupled to the micro-ring structure and located above the silicon waveguide on the second bridge portion.

Example 22 includes the PIC of Example 21, wherein the first bridge portion and the second bridge portion are substantially colinear.

Example 23 includes the PIC of Example 21 or Example 22, wherein the first metal trace and the second metal trace are respective heater traces.

Example 24 includes the PIC of Example 21 or Example 22, wherein the first metal trace and the second metal trace comprise a heater trace and a ground trace.

Example 25 includes the PIC of Example 20, wherein the metal trace is a first metal trace, the bridge portion is a first bridge portion, and further comprising: a second bridge portion in the air cavity, colinear with the first bridge portion; and a second metal trace conductively coupled to the micro-ring structure and located on the second bridge portion.

Example 26 includes the PIC of Example 25, wherein the first metal trace and the second metal trace comprise a heater trace and a signal trace.

Example 27 includes the PIC of Example 20, wherein the metal trace is a first metal trace, the bridge portion is a first bridge portion, and further comprising: a second bridge portion in the air cavity, parallel with the first bridge portion; and a second metal trace conductively coupled to the micro-ring structure and located on the second bridge portion.

Example 28 includes the PIC of Example 27, wherein the first metal trace and the second metal trace comprise a heater trace and a signal trace.

Example 29 includes the PIC of Example 27, wherein the first metal trace and the second metal trace comprise a ground trace and a signal trace.

Example 30 includes the PIC of Example 20, wherein the metal trace is a first metal trace, the silicon waveguide is a first silicon waveguide, the bridge portion is a first bridge portion, and further comprising: a second bridge portion in the air cavity; a second silicon waveguide located on the second bridge portion; and a second metal trace conductively coupled to the micro-ring structure and located above the second silicon waveguide on the second bridge portion.

Example 31 includes the PIC of Example 30, wherein the first metal trace and the second metal trace are respective heater traces.

Example 32 includes the PIC of Example 30, wherein the first metal trace and the second metal trace comprise a heater trace and a ground trace.

Example 33 includes the PIC of Example 20, wherein the metal trace is a first metal trace, the silicon waveguide is a first silicon waveguide, the bridge portion is a first bridge portion, and further comprising: a second bridge portion in the air cavity and substantially colinear with the first bridge portion; the silicon waveguide extending across the air cavity and further located on the second bridge portion; a third bridge portion in the air cavity, the third bridge portion substantially parallel with the first bridge portion; a second silicon waveguide located on the third bridge portion; and a second metal trace conductively coupled to the micro-ring structure and located above the first silicon waveguide on the second bridge portion.

Example 34 includes the PIC of Example 20, wherein the metal trace is a first metal trace, the silicon waveguide is a first silicon waveguide, the bridge portion is a first bridge portion, and further comprising: a second bridge portion in the air cavity and substantially colinear with the first bridge portion; the silicon waveguide extending across the air cavity and further located on the second bridge portion; a third bridge portion in the air cavity, the third bridge portion substantially parallel with the first bridge portion; a second silicon waveguide located on the third bridge portion: and a second metal trace conductively coupled to the micro-ring structure and located above the second silicon waveguide on the second bridge portion.

Example 35 includes the PIC of Example 20, wherein the metal trace is a first metal trace, the bridge portion is a first bridge portion, and further comprising: a second bridge portion in the air cavity and substantially colinear with the first bridge portion; a third bridge portion in the air cavity, the third bridge portion substantially parallel with the first bridge portion; the silicon waveguide extending across the air cavity and further located on the second bridge portion; and
    a second metal trace conductively coupled to the micro-ring structure and located on the third bridge portion.

Example 36 includes the PIC of Example 20, wherein the metal trace is a first metal trace, the silicon waveguide is a first silicon waveguide, the bridge portion is a first bridge portion, and further comprising: a second bridge portion in the air cavity and substantially colinear with the first bridge portion; a third bridge portion and a fourth bridge portion in the air cavity, the third bridge portion and fourth bridge portion being substantially colinear with each other and substantially parallel with the first bridge portion and second bridge portion; the first silicon waveguide extending across the air cavity and further located on the second bridge portion; a second silicon waveguide located on the third bridge portion; a second metal trace conductively coupled to the micro-ring structure and located above the first silicon waveguide on the second bridge portion; a third metal trace conductively coupled to the micro-ring structure and located above the second silicon waveguide on the third bridge portion; and a fourth metal trace conductively coupled to the micro-ring structure and located on the fourth bridge portion.

Example 37 includes the PIC of Example 36, wherein the first metal trace is a ground trace, the second metal trace and the third metal trace are respective heater traces, and the fourth metal trace is a signal trace.

Example 38 includes the PIC of Example 36, wherein the first metal trace and the second metal trace are respective heater traces, the third metal trace is a ground trace, and the fourth metal trace is a signal trace.

Example 39 is a multi-chip package (MCP), comprising: a package substrate; a photonic integrated circuit (PIC) attached to the package substrate; the PIC comprising: a ring resonator structure comprising a micro-ring structure and a silicon waveguide, the ring resonator structure located between a PIC substrate and a PIC oxide layer; an air cavity in the PIC substrate surrounding the micro-ring structure, the air cavity comprising a trench portion that is open to an upper surface of the PIC oxide layer, and a bridge portion that does not open to the upper surface; the silicon waveguide located on the bridge portion; and a metal trace conductively coupled to the micro-ring structure and located above the silicon waveguide on the bridge portion.

Example 40 includes the MCP of Example 39, further comprising an electronic integrated circuit (EIC) attached to the package substrate and in electrical communication with the PIC.

What is claimed is:

1. A structure, comprising:
   a substrate;
   an oxide layer overlaid on the substrate;
   a ring resonator structure comprising a micro-ring structure and a silicon waveguide, the micro-ring structure located between the substrate and the oxide layer;
   an air cavity in the substrate surrounding the micro-ring structure, the air cavity comprising a trench portion that is open to an upper surface of the oxide layer, and a bridge portion that does not open to the upper surface of the oxide layer;
   the silicon waveguide located on the bridge portion; and
   a metal trace conductively coupled to the micro-ring structure and located above the silicon waveguide on the bridge portion.

2. The structure of claim 1, wherein the metal trace is a first metal trace, the bridge portion is a first bridge portion, and further comprising:
   a second bridge portion in the air cavity;
   the silicon waveguide extending across the air cavity and further located on the second bridge portion; and
   a second metal trace conductively coupled to the micro-ring structure and located above the silicon waveguide on the second bridge portion.

3. The structure of claim 2, wherein the first bridge portion and the second bridge portion are substantially colinear.

4. The structure of claim 2, wherein the first metal trace and the second metal trace are respective heater traces.

5. The structure of claim 2, wherein the first metal trace and the second metal trace comprise a heater trace and a ground trace.

6. The structure of claim 1, wherein the metal trace is a first metal trace, the bridge portion is a first bridge portion, and further comprising:
   a second bridge portion in the air cavity, colinear with the first bridge portion; and
   a second metal trace conductively coupled to the micro-ring structure and located on the second bridge portion.

7. The structure of claim 6, wherein the first metal trace and the second metal trace comprise a heater trace and a signal trace.

8. The structure of claim 1, wherein the metal trace is a first metal trace, the bridge portion is a first bridge portion, and further comprising:
   a second bridge portion in the air cavity, parallel with the first bridge portion; and
   a second metal trace conductively coupled to the micro-ring structure and located on the second bridge portion.

9. The structure of claim 8, wherein the first metal trace and the second metal trace comprise a heater trace and a signal trace.

10. The structure of claim 8, wherein the first metal trace and the second metal trace comprise a ground trace and a signal trace.

11. The structure of claim 1, wherein the metal trace is a first metal trace, the silicon waveguide is a first silicon waveguide, the bridge portion is a first bridge portion, and further comprising:
    a second bridge portion in the air cavity;
    a second silicon waveguide located on the second bridge portion; and
    a second metal trace conductively coupled to the micro-ring structure and located above the second silicon waveguide on the second bridge portion.

12. The structure of claim 1, wherein the metal trace is a first metal trace, the silicon waveguide is a first silicon waveguide, the bridge portion is a first bridge portion, and further comprising:
    a second bridge portion in the air cavity and substantially colinear with the first bridge portion;
    the silicon waveguide extending across the air cavity and further located on the second bridge portion;
    a third bridge portion in the air cavity, the third bridge portion substantially parallel with the first bridge portion;
    a second silicon waveguide located on the third bridge portion; and
    a second metal trace conductively coupled to the micro-ring structure and located above the first silicon waveguide on the second bridge portion.

13. The structure of claim 1, wherein the metal trace is a first metal trace, the silicon waveguide is a first silicon waveguide, the bridge portion is a first bridge portion, and further comprising:
    a second bridge portion in the air cavity and substantially colinear with the first bridge portion;
    the silicon waveguide extending across the air cavity and further located on the second bridge portion;
    a third bridge portion in the air cavity, the third bridge portion substantially parallel with the first bridge portion;
    a second silicon waveguide located on the third bridge portion; and
    a second metal trace conductively coupled to the micro-ring structure and located above the second silicon waveguide on the second bridge portion.

14. The structure of claim 1, wherein the metal trace is a first metal trace, the bridge portion is a first bridge portion, and further comprising:
  a second bridge portion in the air cavity and substantially colinear with the first bridge portion;
  a third bridge portion in the air cavity, the third bridge portion substantially parallel with the first bridge portion;
  the silicon waveguide extending across the air cavity and further located on the second bridge portion; and
  a second metal trace conductively coupled to the micro-ring structure and located on the third bridge portion.

15. The structure of claim 1, wherein the metal trace is a first metal trace, the silicon waveguide is a first silicon waveguide, the bridge portion is a first bridge portion, and further comprising:
  a second bridge portion in the air cavity and substantially colinear with the first bridge portion;
  a third bridge portion and a fourth bridge portion in the air cavity, the third bridge portion and fourth bridge portion being substantially colinear with each other and substantially parallel with the first bridge portion and second bridge portion;
  the first silicon waveguide extending across the air cavity and further located on the second bridge portion;
  a second silicon waveguide located on the third bridge portion;
  a second metal trace conductively coupled to the micro-ring structure and located above the first silicon waveguide on the second bridge portion;
  a third metal trace conductively coupled to the micro-ring structure and located above the second silicon waveguide on the third bridge portion; and
  a fourth metal trace conductively coupled to the micro-ring structure and located on the fourth bridge portion.

16. A photonic integrated circuit (PIC), comprising:
  a substrate;
  an oxide layer located on the substrate;
  a ring resonator structure comprising a micro-ring structure and a silicon waveguide, the ring resonator structure located between the substrate and the oxide layer;
  an air cavity in the substrate surrounding the micro-ring structure, the air cavity comprising a trench portion that is open to an upper surface of the oxide layer, and a bridge portion that does not open to the upper surface;
  the silicon waveguide located on the bridge portion; and
  a metal trace conductively coupled to the micro-ring structure and located above the silicon waveguide on the bridge portion.

17. The PIC of claim 16, wherein the metal trace is a first metal trace, the bridge portion is a first bridge portion, and further comprising:
  a second bridge portion in the air cavity;
  the silicon waveguide extending across the air cavity and further located on the second bridge portion; and
  a second metal trace conductively coupled to the micro-ring structure and located above the silicon waveguide on the second bridge portion.

18. The PIC of claim 16, wherein the metal trace is a first metal trace, the bridge portion is a first bridge portion, and further comprising:
  a second bridge portion in the air cavity, colinear with the first bridge portion; and
  a second metal trace conductively coupled to the micro-ring structure and located on the second bridge portion.

19. The PIC of claim 16, wherein the metal trace is a first metal trace, the bridge portion is a first bridge portion, and further comprising:
  a second bridge portion in the air cavity, parallel with the first bridge portion; and
  a second metal trace conductively coupled to the micro-ring structure and located on the second bridge portion.

20. The PIC of claim 16, wherein the metal trace is a first metal trace, the silicon waveguide is a first silicon waveguide, the bridge portion is a first bridge portion, and further comprising:
  a second bridge portion in the air cavity;
  a second silicon waveguide located on the second bridge portion; and
  a second metal trace conductively coupled to the micro-ring structure and located above the second silicon waveguide on the second bridge portion.

21. The PIC of claim 20, wherein the first metal trace and the second metal trace are respective heater traces.

22. The PIC of claim 20, wherein the first metal trace and the second metal trace comprise a heater trace and a ground trace.

23. The PIC of claim 20, wherein the metal trace is a first metal trace, the silicon waveguide is a first silicon waveguide, the bridge portion is a first bridge portion, and further comprising:
  a second bridge portion in the air cavity and substantially colinear with the first bridge portion;
  the silicon waveguide extending across the air cavity and further located on the second bridge portion;
  a third bridge portion in the air cavity, the third bridge portion substantially parallel with the first bridge portion;
  a second silicon waveguide located on the third bridge portion; and
  a second metal trace conductively coupled to the micro-ring structure and located above the first silicon waveguide on the second bridge portion.

24. A multi-chip package (MCP), comprising:
  a package substrate;
  a photonic integrated circuit (PIC) attached to the package substrate;
    the PIC having a PIC substrate, and comprising:
      a ring resonator structure comprising a micro-ring structure and a silicon waveguide, the ring resonator structure located between the PIC substrate and a PIC oxide layer;
      an air cavity in the PIC substrate surrounding the micro-ring structure, the air cavity comprising a trench portion that is open to an upper surface of the PIC oxide layer, and a bridge portion that does not open to the upper surface;
      the silicon waveguide located on the bridge portion; and
      a metal trace conductively coupled to the micro-ring structure and located above the silicon waveguide on the bridge portion.

25. The MCP of claim 24, further comprising an electronic integrated circuit (EIC) attached to the package substrate and in electrical communication with the PIC.

* * * * *